US011163100B2

(12) United States Patent
Armbruster et al.

(10) Patent No.: US 11,163,100 B2
(45) Date of Patent: Nov. 2, 2021

(54) LIGHT FIXTURES HAVING WAVEGUIDES AND RELATED METHODS

(71) Applicant: Lucifer Lighting Company, San Antonio, TX (US)

(72) Inventors: Till Armbruster, San Antonio, TX (US); Andreas Shulz, San Antonio, TX (US); Anuj Maloo, San Antonio, TX (US); Matt Tenorio, San Antonio, TX (US); Chris Reed, San Antonio, TX (US); Jack Reilly, San Antonio, TX (US)

(73) Assignee: Lucifer Lighting Company, San Antonio, TX (US)

( * ) Notice: Subject to any disclaimer, the term of this patent is extended or adjusted under 35 U.S.C. 154(b) by 0 days.

(21) Appl. No.: 16/775,059

(22) Filed: Jan. 28, 2020

(65) Prior Publication Data

US 2021/0231855 A1 Jul. 29, 2021

(51) Int. Cl.
*F21V 8/00* (2006.01)
*F21K 9/60* (2016.01)
(Continued)

(52) U.S. Cl.
CPC .............. *G02B 6/0001* (2013.01); *F21K 9/60* (2016.08); *F21K 9/61* (2016.08); *F21S 6/008* (2013.01);
(Continued)

(58) Field of Classification Search
CPC .......... G02B 6/0001; F21K 9/61; F21S 6/007; F21S 6/008
See application file for complete search history.

(56) References Cited

U.S. PATENT DOCUMENTS

| 6,474,831 B1 | 11/2002 | Ruuttu et al. |
| D607,138 S | 12/2009 | Pickett |

(Continued)

FOREIGN PATENT DOCUMENTS

| KR | 20060110341 | 10/2006 |
| KR | 20120052289 | 5/2012 |
| KR | 20170034927 | 3/2017 |

OTHER PUBLICATIONS

International Search Report and Written Opinion issued in Corresponding PCT Application No. PCT/US2021/015295, dated May 21, 2021.

*Primary Examiner* — William N Harris
(74) *Attorney, Agent, or Firm* — Norton Rose Fulbright US LLP

(57) ABSTRACT

Some embodiments of the present light fixtures include a body, a waveguide, and one or more independently-controllable light sources. The waveguide is configured to be coupled to the body and may include a first end configured to receive light emitted from at least one of the light source(s) and to direct the received light to (and in some embodiments, emit the received light from) a second end of the waveguide. In some embodiments of the present fixtures, the waveguide defines an opening through which light emitted from at least one of the light source(s) can pass, the light source(s) being coupled to the body such that a first one of the light source(s) emits light into the first end of the waveguide and a second one of the light source emits light through the opening.

27 Claims, 19 Drawing Sheets

(51) Int. Cl.
*F21K 9/61* (2016.01)
*F21S 6/00* (2006.01)
*F21Y 115/10* (2016.01)
*F21V 29/77* (2015.01)

(52) U.S. Cl.
CPC ......... *F21V 29/773* (2015.01); *F21Y 2115/10* (2016.08)

(56) References Cited

U.S. PATENT DOCUMENTS

| | | |
|---|---|---|
| D619,754 S | 7/2010 | Lai et al. |
| D620,635 S | 7/2010 | Chen et al. |
| D650,516 S | 12/2011 | Lai et al. |
| D783,883 S | 4/2017 | Cortez |
| 9,845,921 B2* | 12/2017 | Van Bommel ........ F21V 7/0091 |
| D856,571 S | 8/2019 | Chami |
| D861,958 S | 10/2019 | Winters |
| 10,520,146 B2* | 12/2019 | Hou ..................... F21V 3/02 |
| 10,775,018 B1* | 9/2020 | Grove ................... F21S 8/046 |
| 10,837,611 B2* | 11/2020 | Hou ..................... F21V 3/049 |
| 10,876,693 B2* | 12/2020 | Li ......................... F21V 29/70 |
| D907,840 S | 1/2021 | Wilcox et al. |
| D908,266 S | 1/2021 | Winters |
| D909,656 S | 2/2021 | Ng et al. |
| 2014/0140096 A1 | 5/2014 | Van Bommel et al. |
| 2014/0340927 A1* | 11/2014 | Johnston ................. F21K 9/62 362/555 |
| 2015/0184827 A1* | 7/2015 | Lin ..................... G02B 6/0001 362/311.02 |
| 2017/0184771 A1* | 6/2017 | Lin ..................... F21V 7/0091 |
| 2019/0316739 A1* | 10/2019 | Gao ..................... F21K 9/232 |
| 2019/0383451 A1* | 12/2019 | Robinson ............ G02B 6/0001 |

* cited by examiner

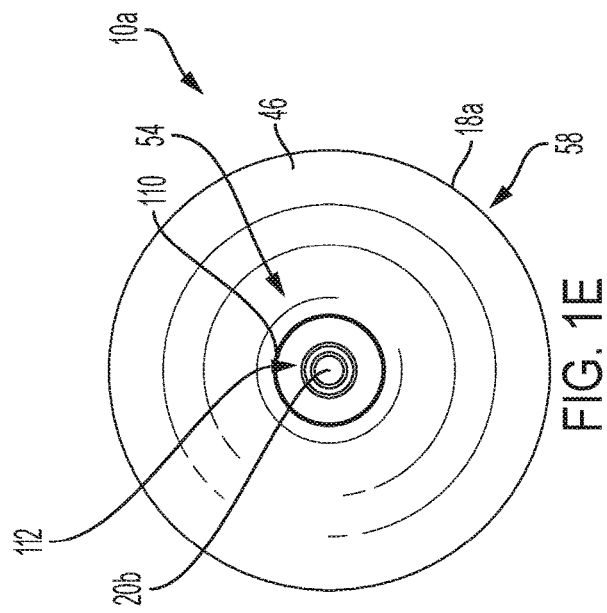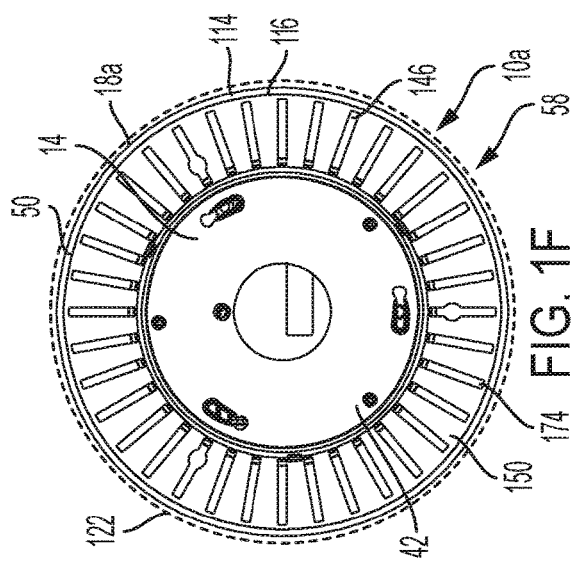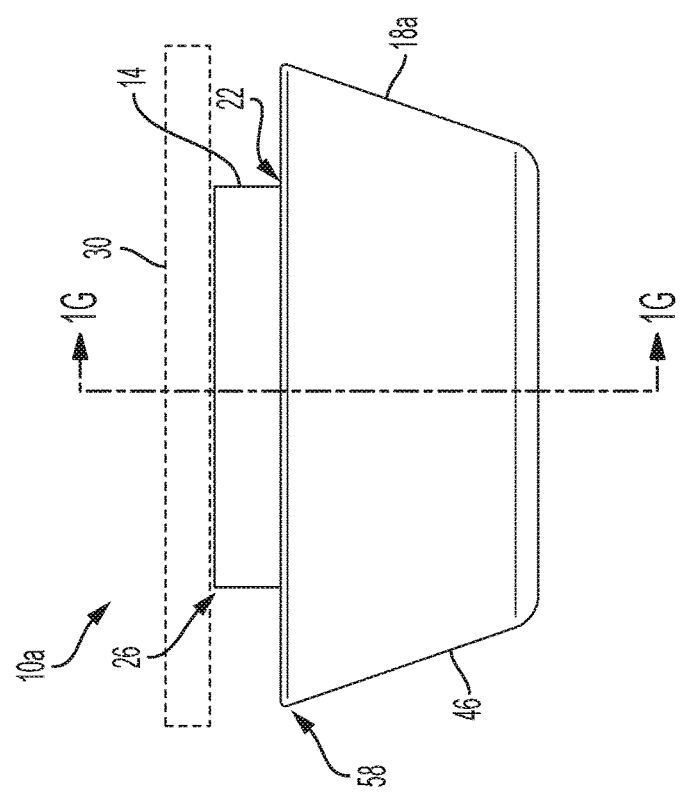

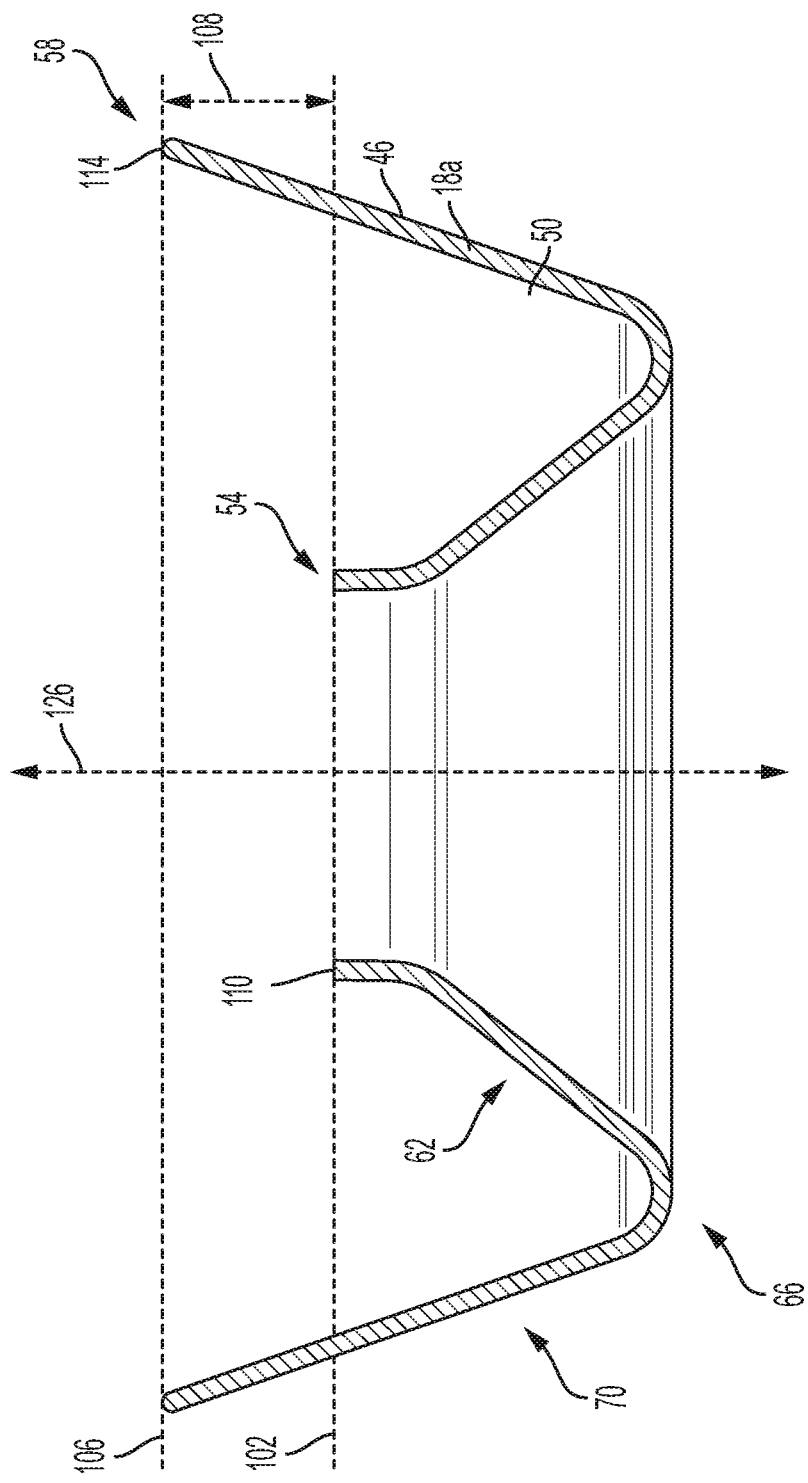

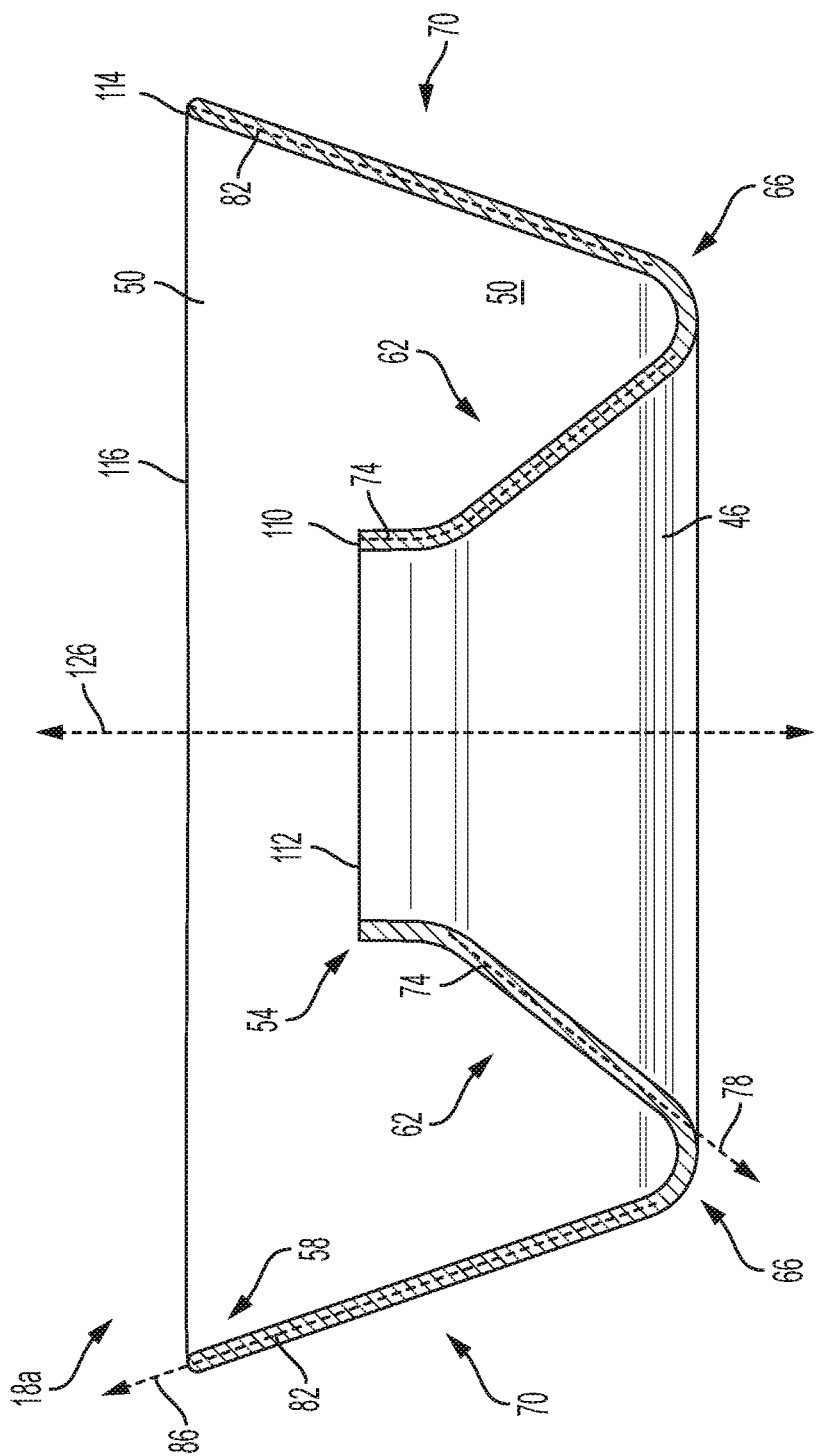

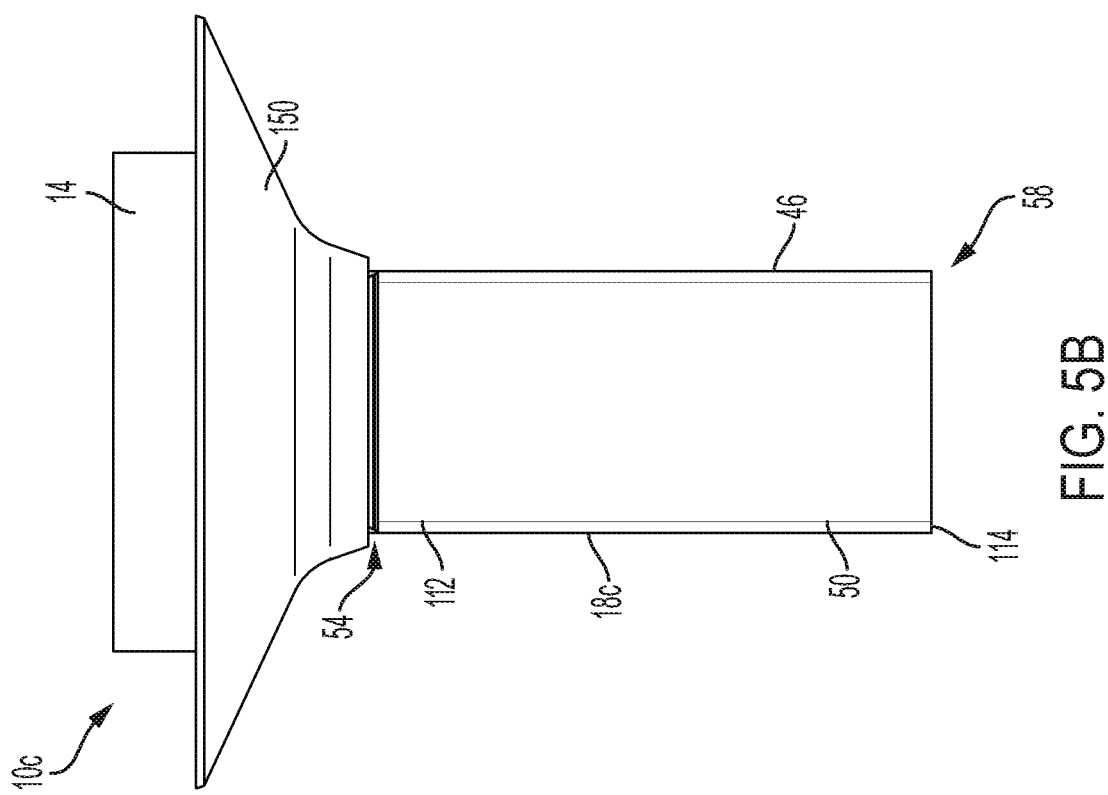
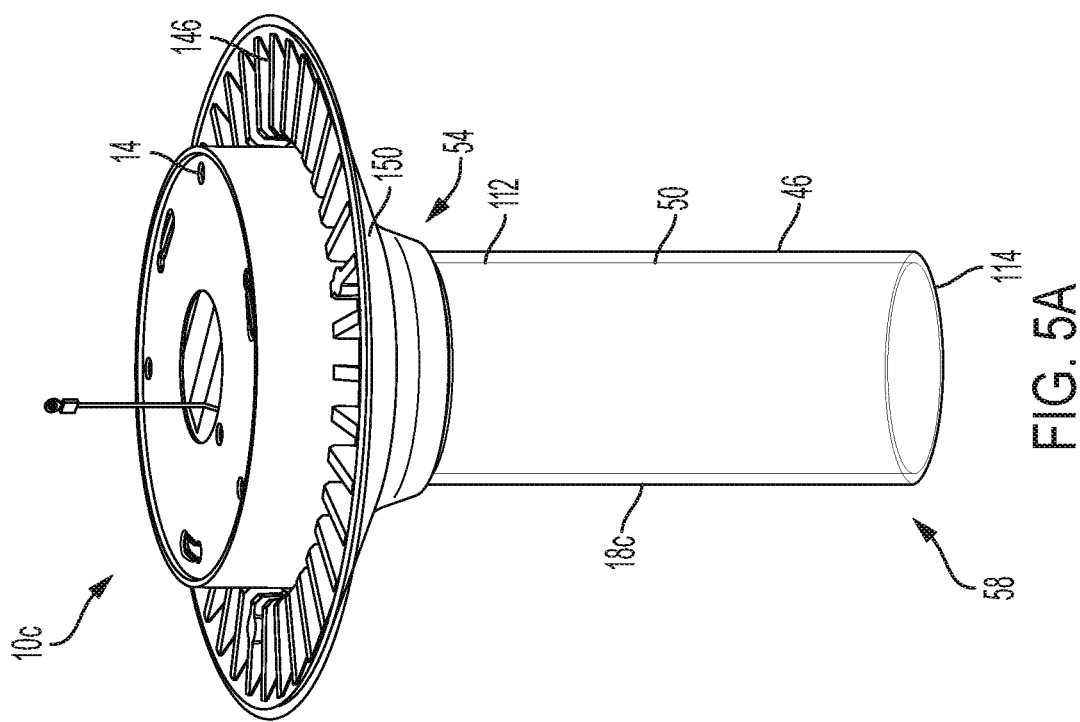

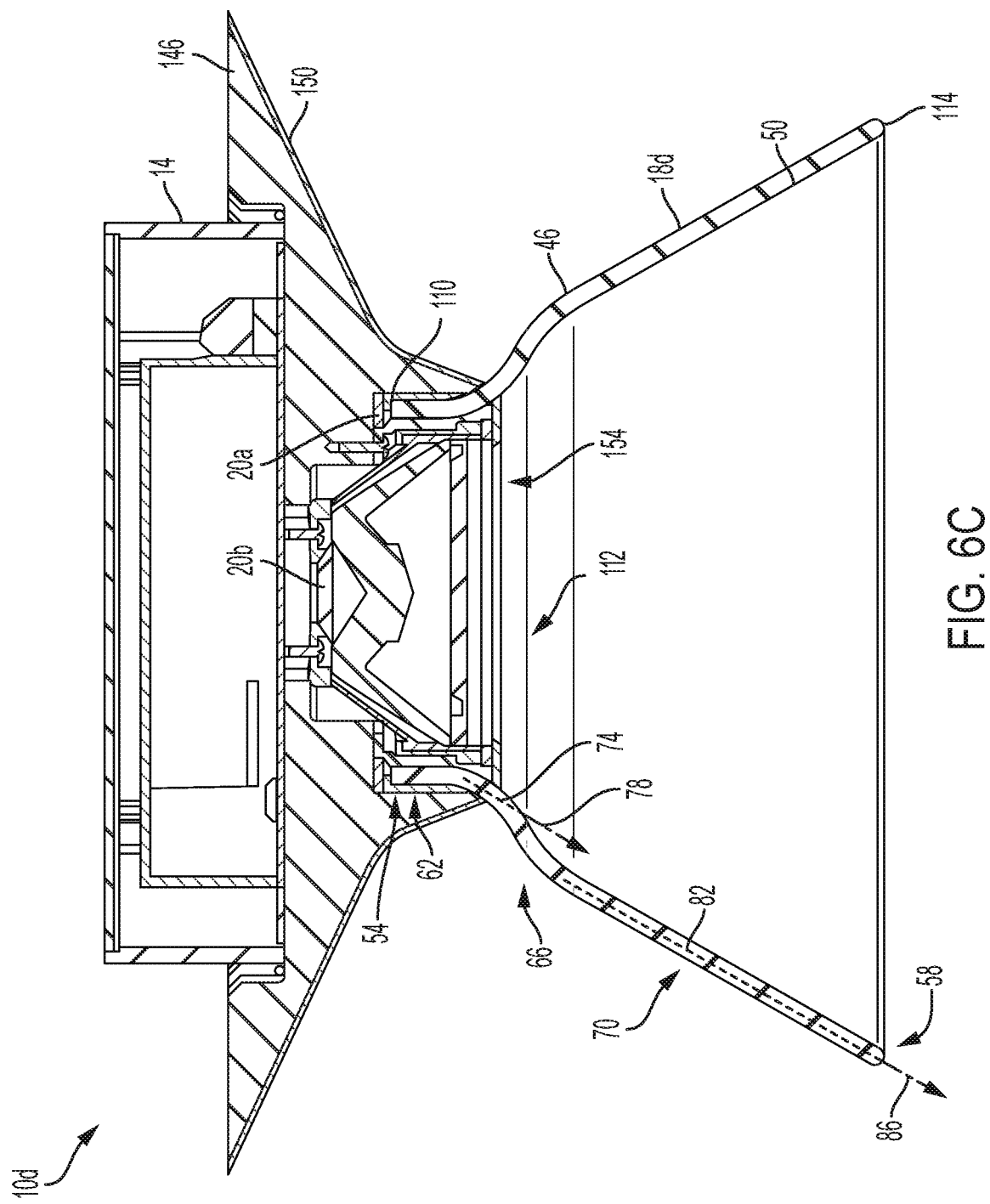

LIGHT FIXTURES HAVING WAVEGUIDES AND RELATED METHODS

BACKGROUND

1. Field of the Invention

The present invention relates generally to techniques and constructs of light fixtures to include multiple layers of light both with and without the assistance of optical wave guides.

2. Description of Related Art

Traditionally, light fixtures of varying design profile have been used in a common space to create layers of light. This is done to create visual interest or aesthetic appeal. The need for this capability has been amplified more recently as interior and exterior spaces have been used for different purposes throughout the year, month, or even day. One way fixtures of varying design profile are utilized to highlight changes in space usage is their ability to disappear in the room when off, while others create a large presence in the space while on or off. For example, downlight fixtures, which are recessed or surface mounted to the ceiling, typically are designed to disappear into the space when off, while a chandelier in the same space will be apparent to the occupants of the space whether on or off. This shared space trend has pushed fixtures to become more adaptive in nature.

SUMMARY

Some embodiments of the present fixtures are configured for multiple-light-source lighting, where such light sources can be independently controlled to allow for aesthetically appealing and controllable lighting.

Some embodiments of the present light fixtures comprise a body, a first light source configured to be coupled to the body, the first light source configured to emit light, a waveguide comprising a first end comprising a first surface and a second end comprising a second surface, wherein the waveguide is configured to be coupled to the body such that light emitted from the first light source is received by the first end and is directed to the second end, and a second light source configured to be coupled to the body, the second light source configured to emit light through an opening in the waveguide. Some light fixtures comprise circuitry electrically coupled to the first light source and the second light source, the circuitry configured to independently control a luminous output of the first light source and a luminous output of the second light source. In some light fixtures, the first end of the waveguide includes the opening, and the second light source is positioned within a volume defined by a projection of the perimeter of the opening, the projection being along a central axis of the opening.

In some light fixtures, the first light source comprises a plurality of light-emitting diodes (LEDs). In some light fixtures, for each of the plurality of LEDs of the first light source, a minimum distance between the LED and another one of the LEDs is substantially the same. In some light fixtures, the plurality of LEDs of the first light source are spaced from one another at substantially equal angular intervals around a central axis. In some light fixtures, for each of the plurality of LEDs of the first light source, a distance between the LED and an adjacent one of the LEDs is substantially equal to a perimeter of the first surface divided by the number of the plurality of LEDs. In some light fixtures, a perimeter of the first surface is curved, and the plurality of LEDs of the first light source are positioned in a curved shape.

In some light fixtures, the waveguide is configured to disperse light received from the first light source at a first color temperature, and the second light source is configured to emit light at a second color temperature that is 90% or less of the first color temperature. In some light fixtures, the waveguide is configured to disperse light received from the first light source at a first color temperature, and the second light source is configured to emit light at a second color temperature that is 110% or more of the first color temperature.

In some light fixtures, a perimeter of the second surface is greater than a perimeter of the first surface. In some light fixtures, a perimeter of the second surface is less than a perimeter of the first surface. In some light fixtures, a majority, by area, of the first surface is in a first plane, a majority, by area, of the second surface is in a second plane, and a portion of the waveguide between the first end and the second end is not disposed between the first plane and the second plane. In some light fixtures, the first plane and the second plane are coplanar.

In some light fixtures, at least 90% of the first surface, by area, is in a first plane, and the second surface is curved. In some light fixtures, a perimeter of the first surface is curved, and a perimeter of the second surface is curved.

In some light fixtures, the body is configured to be coupled to a structure such that light is dispersed out of the second surface of the waveguide and onto the structure. In some light fixtures, the body is configured to be coupled to a structure such that the second end of the waveguide is disposed closer to the structure than is the first end of the waveguide.

In some light fixtures, the waveguide has a transmittance, measured through inner and outer surfaces of the waveguide that each extend from the first end to the second end, of at least 90%. Some light fixtures comprise a second waveguide, wherein the second waveguide comprises a first end and a second end and is configured to be coupled to the body such that light emitted from the first light source and/or a third light source is received by the first end of the second waveguide and is directed to the second end of the second waveguide.

Some of the present light fixtures comprise a body configured to receive two or more light sources, and a waveguide including first and second ends and an opening, wherein the waveguide is configured to be coupled to the body such that light emitted from a first light source of the two or more light sources is received at the first end and is directed to the second end, light emitted from a second light source of the two or more light sources passes through the opening, and a cross-section of the waveguide includes first and second portions connected by an inflecting portion, wherein the first portion extends from the first end to the inflecting portion, a line extending from the first end to the inflecting portion aligned in a first direction, the second portion extends from the inflecting portion to the second end, a line extending from the inflecting portion to the second end aligned in a second direction, and the first and second directions have opposing but parallel components. In some fixtures, the portion of the waveguide that defines the first portion includes the opening.

In some fixtures, the waveguide includes opposing inner and outer surfaces, each extending between the first and second ends, and a transmittance of the waveguide, measured through the inner and outer surfaces, is at least 90%.

In some fixtures, the waveguide is annular such that, when the waveguide is coupled to the body, a volume defined by a projection of a cross-sectional perimeter of the waveguide contains the body, the projection being along a central axis of the waveguide.

In some fixtures, when the waveguide is coupled to the body and the body is coupled to a structure, the second end of the waveguide is disposed closer to the structure than is at least the first light source of the two or more light sources.

Some of the present light fixtures comprise a body configured to receive two or more light sources and a waveguide including first and second ends and an opening, wherein the waveguide is configured to be coupled to the body such that light emitted from a first light source of the two more light sources is received by the first end and is directed to the second end, and light emitted from a second light source of the two or more light sources passes through the opening, wherein the waveguide is annular such that a volume defined by a projection of a cross-sectional perimeter of the waveguide contains the body, the projection being along a central axis of the waveguide, wherein the waveguide includes opposing inner and outer surfaces, each extending between the first and second ends, and a transmittance of the waveguide, measured through the inner and outer surfaces, is at least 90%.

In some fixtures, the proportion of light that is output from the waveguide is at least 25% of the light emitted from the first light source. In some fixtures, the first light source is annular.

Some fixtures comprise circuitry configured to be coupled to the first light source and the second light source such that the first light source and the second light source are independently-controllable.

In some fixtures, when the waveguide is coupled to the body, the waveguide defines a cross-sectional perimeter of the light fixture. Some fixtures comprise a heat sink configured to be coupled to the body such that, when the waveguide is coupled to the body, a volume defined by a projection of a cross-sectional perimeter of the waveguide contains the heat sink, the projection being along a central axis of the waveguide.

Some of the present methods of operating a light fixture comprise illuminating a first light source of the light fixture such that light emitted by the first light source is received by a first end of a waveguide of the light fixture, the waveguide being configured to direct the received light from the first end to a second end of the waveguide and disperse light out of a surface of the waveguide when the first light source is illuminated, and illuminating a second light source of the light fixture. In some methods, the waveguide includes an opening, and the second light source is positioned within a volume defined by a projection of the perimeter of the opening, the projection being along a central axis of the opening.

Some methods comprise turning off or dimming the first light source without turning off or dimming the second light source. Some methods comprise turning off or dimming the second light source without turning off or dimming the first light source.

Some methods comprise dimming the first light source, wherein, as the first light source is dimmed, a color temperature of light dispersed from the waveguide decreases. Some methods comprise maintaining a color temperature of the second light source while the first light source is dimmed. Some methods comprise changing a color temperature of light emitted from the second light source while maintaining a color temperature of light dispersed from the waveguide.

Some of the present methods of operating a light fixture comprise illuminating a first light source of the light fixture such that light emitted from the first light source is received by a first end of a waveguide, the waveguide including a second end to which at least some of the received light is directed, and a cross-section having first and second portions connected by an inflecting portion, wherein the first portion extends from the first end to the inflecting portion, a line extending from the first end to the inflecting portion aligned in a first direction, the second portion extends from the inflecting portion to the second end, a line extending from the inflecting portion to the second end aligned in a second direction, and the first and second directions have opposing but parallel components, and illuminating a second light source of the light fixture such that light emitted from the second light source passes through an opening of the waveguide.

Some methods comprise turning off or dimming the first light source without turning off or dimming the second light source. Some methods comprise turning off or dimming the second light source without turning off or dimming the first light source.

In some methods, the second end of the waveguide is disposed above the first end of the waveguide. In some methods, the second end of the waveguide is disposed above the first light source and, optionally, the second light source.

In some methods, the waveguide includes opposing inner and outer surfaces, each extending between the first and second ends, and a transmittance of the waveguide, measured through the inner and outer surfaces, is at least 90%. In some methods, the first and second light sources are coupled to a body of the light fixture, and the waveguide is annular such that a volume defined by a projection of a cross-sectional perimeter of the waveguide contains the body, the projection being along a central axis of the waveguide.

The term "coupled" is defined as connected, although not necessarily directly, and not necessarily mechanically. Two items that are "coupled" may be unitary with each other or may be separated by intermediate components or elements. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes 0.1, 1, 5, and 10 percent. Further, an apparatus or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those one or more elements. Likewise, a method that "comprises," "has,"

"includes," or "contains" one or more steps possesses those one or more steps, but is not limited to possessing only those one or more steps.

Any configuration of any of the apparatuses, systems, and methods can consist of or consist essentially of—rather than comprise/have/include/contain—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one configuration may be applied to other configurations, even though not described or illustrated, unless expressly prohibited by this disclosure or the nature of the configurations.

Some details associated with the configurations described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the configuration depicted in the figures.

FIG. 1D-1F are side, bottom, and top views of the light fixture of FIG. 1A.

FIG. 3C is a cross-sectional side view of the waveguide of FIG. 3A, taken along line 3C-3C of FIG. 3B FIG. 3D is a cross-sectional side view of the waveguide of FIG. 3A, taken along line 3D-3D of FIG. 3B.

FIG. 5A is a perspective view of a third embodiment of the present light fixtures that has a waveguide that is an annular cylinder.

FIG. 5B is a side view of the fixture of FIG. 5A.

FIG. 6C is a cross-sectional side view of the light fixture of FIG. 6A, taken along line 6C-6C of FIG. 6B.

DETAILED DESCRIPTION

Figure 1A:
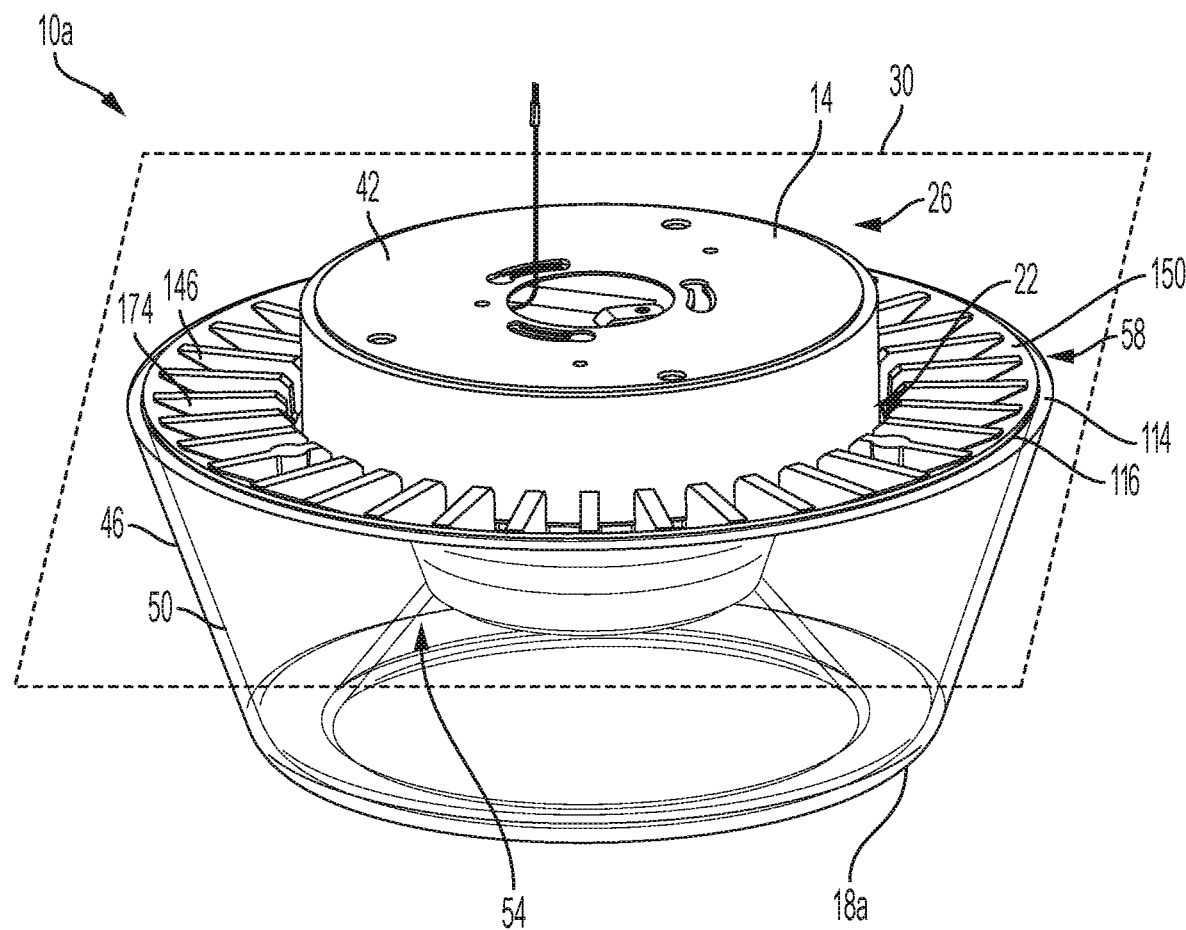
FIG. 1A is a top perspective view of an embodiment of the present light fixtures coupled to a structure.
Figure 1B:
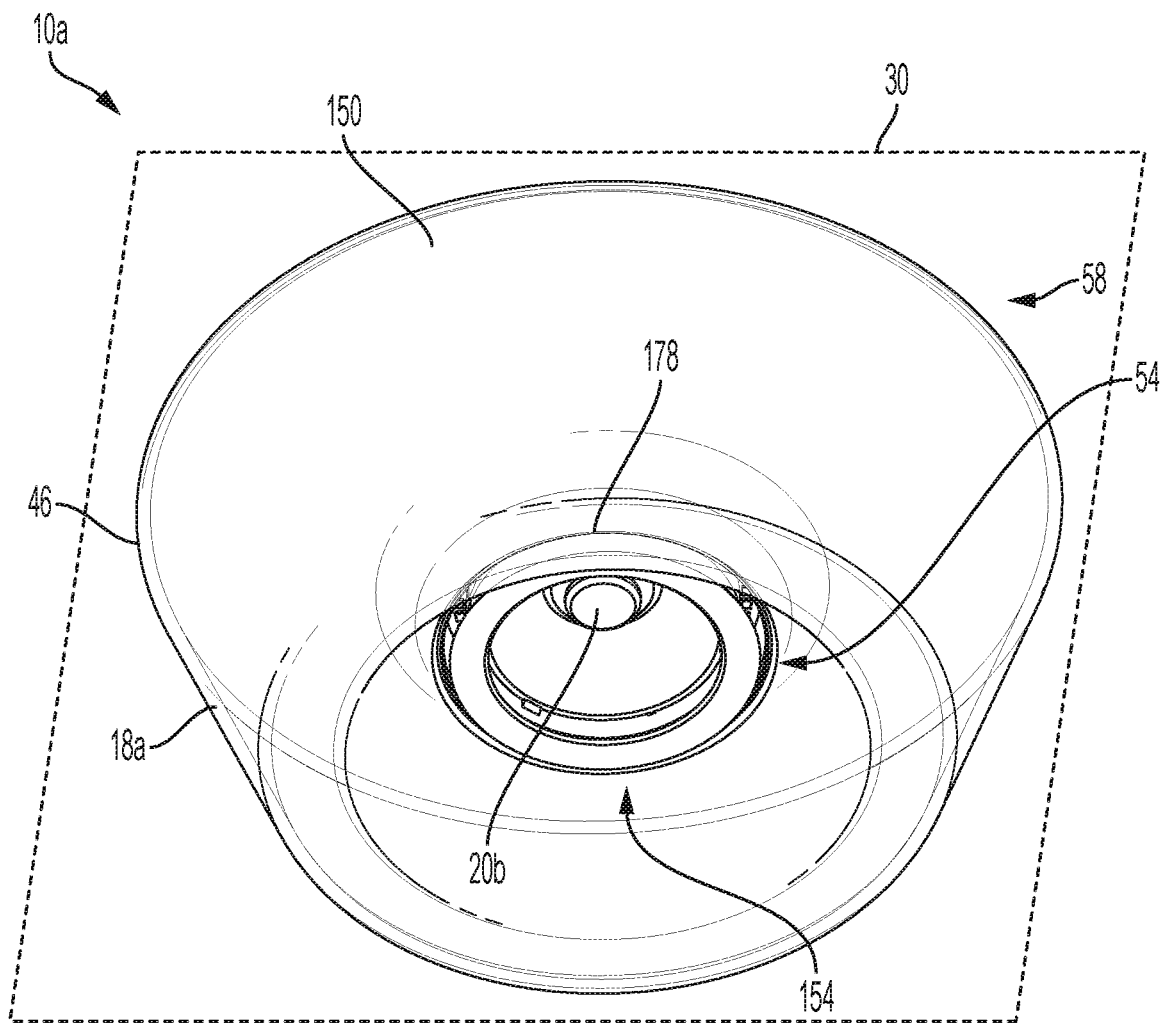
FIG. 1B is a bottom perspective view of the light fixture of FIG. 1A.

Referring now to the drawings, and more particularly to FIGS. 1A-1G, shown therein and designated by the reference numeral 10a is a first embodiment of the present light fixtures. In the embodiment shown, fixture 10a comprises a body 14 and a waveguide 18a configured to be coupled to the body. Body 14 and/or waveguide 18a are configured to be coupled to two or more light sources (e.g., 20a and 20b, described below), each of the light sources is configured to emit visible light.

As shown in FIG. 1A, body 14 is configured to be coupled to a structure (e.g., 30). For example, body 14 may have a first body end 22 and a second body end 26 configured to secure (e.g., affix) fixture 10a to the structure by way of, for example, fasteners (e.g., screws, rivets, and/or the like), interlocking features disposed on the second body end and/or the structure, and/or the like. The structure can comprise any suitable structure, including, but not limited to, a ceiling, wall, floor, light track, junction box, table, and/or the like.

Figure 2:
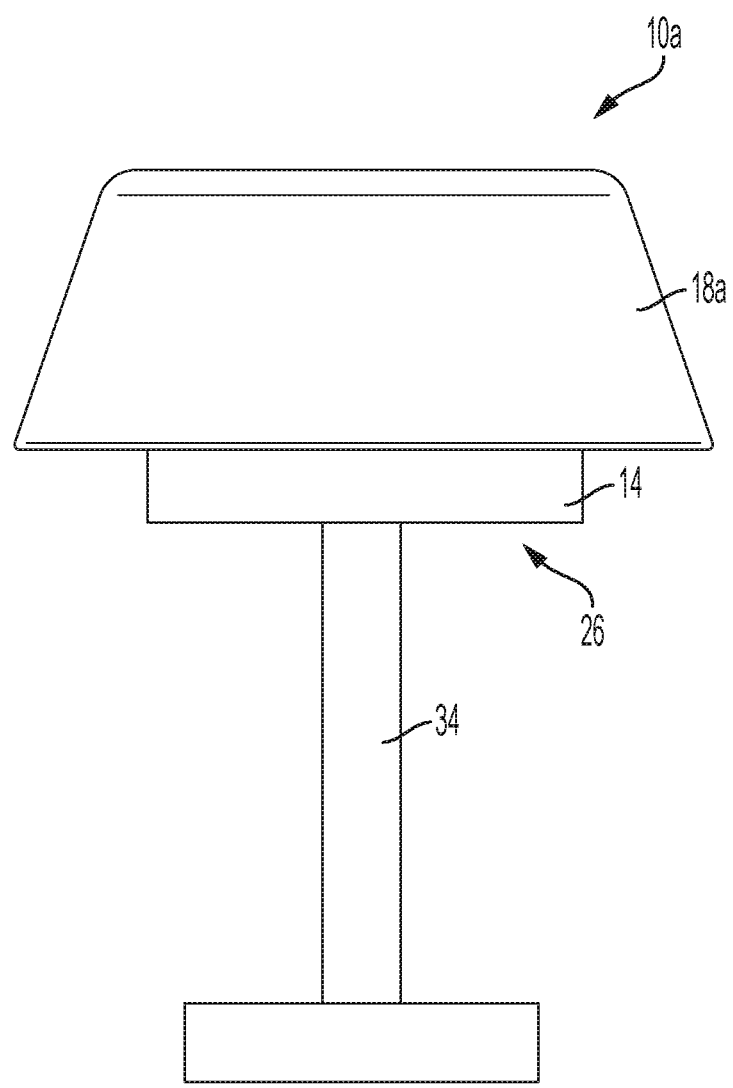
FIG. 2 is a side view of the light fixture of FIG. 1A coupled to an arm through which the fixture can be coupled to a structure.

While in FIG. 1A fixture 10a is illustrated as coupled directly to structure 30, coupling between the fixture and a structure can also be accomplished through one or more intermediate structures. For instance, and referring additionally to FIG. 2, fixture 10a can be coupled to a structure (e.g., 30) via an arm 34 and, optionally (as shown), via a base disposed between the arm and the structure. In this depiction, fixture 10a may be part of a floor lamp, a desk lamp, or the like. Other examples of such intermediate structures include a cable, wire, or rod, each of which may give the appearance of fixture 10a floating in space.

In the embodiment depicted in FIGS. 1A-1G, body 14 is circular (e.g., the body, or a portion thereof, has a circular cross-section). In other embodiments, however, body 14 can have any suitable shape (e.g., having a cross-section that is elliptical or otherwise rounded, triangular, square, rectangular, or otherwise polygonal, or the like).

Body 14 may include an interior volume 38 (FIG. 1G) that is configured to house one or more components of fixture 10a, such as light-emitting diode (LED) drivers, wiring, hardware, driver circuitry, control circuitry, other components, and/or the like. In the embodiment shown, body 14 comprises a removable cover 42 (e.g., that at least in part defines second body end 26) to, for example, conceal and/or protect the component(s) disposed within interior volume 38.

In fixture 10a, waveguide 18a extends between a first end 54 and a second end 58, where the waveguide is configured to be coupled to body 14 via first end 54. Waveguide 18a can be a substantially transparent or translucent member. For example, waveguide 18a can have a transmittance, measured through its outer surface 46 and opposing inner surface 50, each of which extends between first end 54 and second end 58, that is greater than or equal to any one of, or between any two of, 70%, 75%, 80%, 85%, 90%, and 95%. In general terms, waveguide 18*a* is an illumination structure that includes a first surface 110 at first end 54 for receiving light and a propagation region for propagating light (e.g., the portion of the waveguide between first end 54 and second end 58) toward its second end 58. Second end 58 may include a second surface 114 where light exits out of (e.g., disperses from) waveguide 18*a*. Thus, when first end 54 receives light from a light source, such as from first light source 20*a*, light may propagate through waveguide 18*a*—and, in some instances, out of—second surface 114 of second end 58. Second end 58 may include or be coupled to a barrier (e.g., a cap) to prevent the light that is dispersed or released from second surface 114 to be visible.

Waveguide 18*a* may comprise any suitable material for propagating light including, but not limited to, glass, polycarbonate, silicon, and/or polymethyl methacrylate (PMMA). As shown for fixture 10*a* (FIGS. 1A-1G), the thickness of waveguide 18*a* (e.g., a smallest distance between outer and inner surfaces, 46 and 50) can be uniform. But waveguide 18*a* need not have such a uniform thickness. For example, waveguide 18*a* may be tapered such that the thickness of the waveguide at first end 54 may be greater than the thickness of the waveguide at second end 58. Alternatively, waveguide 18*a* may be tapered such that the thickness of the waveguide at first end 54 may be less than the thickness of the waveguide at second end 58.

Waveguide 18*a* may also illuminate or glow when first surface 110 of first end 54 receives light. In general terms, such illumination or glow results from light being extracted out of a surface (e.g., outer surface 46 and/or inner surface 50) of waveguide 18*a*. That extraction may be accomplished by mechanical surface treatments, such as etching or machining, of the waveguide surface. It may also (alone or additionally) be accomplished via waveguide 18*a* including particles configured to scatter light propagating through the waveguide out of the waveguide. Such particles can comprise, for example, a polymeric material, barium sulphate, titanium dioxide, and/or the like.

Figure 3A:
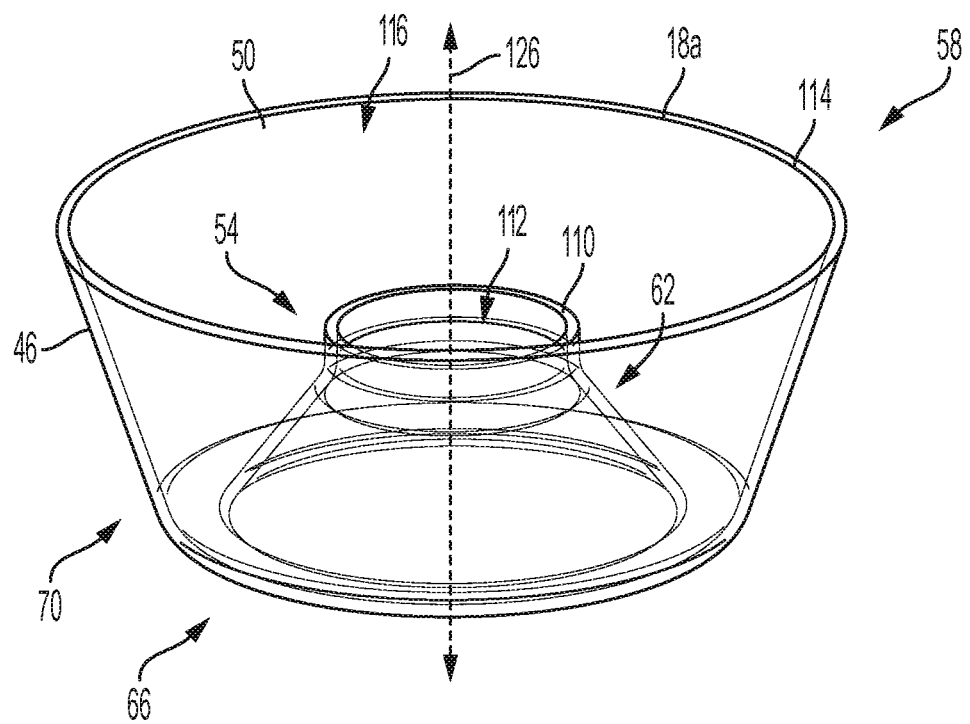
FIG. 3A is a top perspective view of the waveguide of the light fixture of FIG. 1A.
Figure 3B:
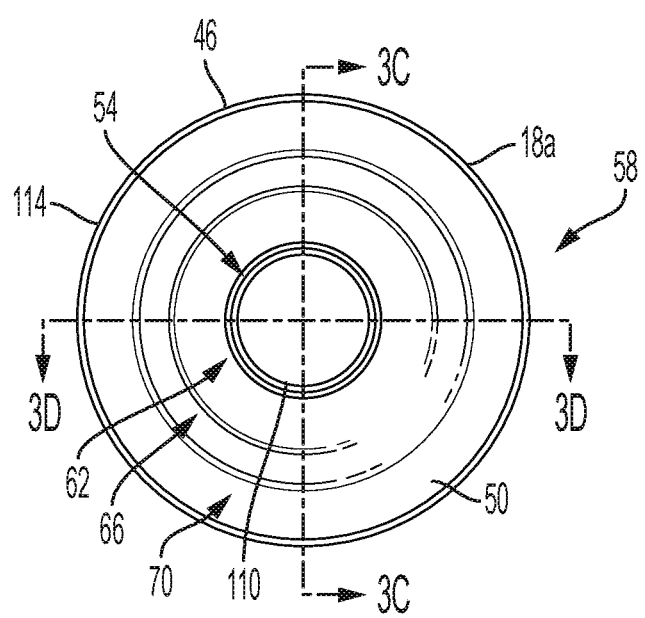
FIG. 3B is a top view of the waveguide of FIG. 3A.

Fixture 10*a* may cast light received by first surface 110 of waveguide 18*a* back onto a structure (e.g., 30) to which the fixture is mounted. Referring additionally to FIGS. 3A-3D, this can be accomplished via the geometry of waveguide 18*a*. To illustrate, waveguide 18*a* can have a cross-section (e.g., taken in a vertical plane and/or a plane that bisects the waveguide) including portions that extend in directions having opposing, parallel (e.g., opposing, vertical) components. Such a cross-section is illustrated in FIG. 3D. To illustrate, waveguide 18*a* can include a first portion 62 extending from first end 54 to an inflecting portion 66 and a second portion 70 extending from the inflecting portion to second end 58. A line 74 extending from first end 54 to inflecting portion 66 can be aligned in a first direction 78, and a line 82 extending from inflecting portion 66 to second end 58 can be aligned in a second direction 86. First and second directions, 78 and 86, can have opposing but parallel components (e.g., opposing vertical components, as shown). In other words, the slopes of lines 74 and 82 can be of opposite sign. More particularly, moving outward from central axis 126 of waveguide 18*a*, the slope of line 74 can be negative and slope of line 82 can be positive (e.g., an inflecting portion 66 can but need not be an area of the waveguide in which, moving outward from the central axis, the slope of the waveguide changes from negative to positive, or—for some embodiments—from positive to negative).

In this manner, first surface 110 can receive light transmitted in a direction having a component away from a structure (e.g., 30), and the waveguide may direct the received light back toward the structure through second surface 114 in a direction having a component that is opposite but parallel to a component of the light's transmission direction. As illustrated, the entirety of second surface 114 is exposed or visible, i.e., it is in contact with ambient air as opposed to another solid object or material. In such embodiments, light emitted from first light source 20*a* may exit (or be dispersed by) second surface 114 and be cast onto structure 30, and the projection can define a shape that is in some proportion to the shape of second end 58. For example, second end 58 may be curved (e.g., circular), in which case the light cast upon the structure can define a curved (e.g., circular) shape. As noted above, however, in certain embodiments, fixture 10*a* may not be configured to cast light back onto the structure, when, for example, second end 58 includes or is coupled to a barrier or cap covering second surface 114.

Second surface 114 may be designed such that it casts light on to structure 30 in an aesthetically pleasing manner. For example, second surface 114 may be curved between outer surface 46 and inner surface 50. More specifically, a majority of the area of second surface 114 may be outside of any single plane. Providing such a curve may result in the dispersion of light exiting second surface 114, thereby attenuating the brightness of the projection.

That components of first direction 78 and second direction 86 are vertically-opposing is non-limiting. The same components—for example, when fixture 10*a* is coupled to a non-horizontal structure—may be opposing and parallel but not vertical. And while as shown, first direction 78 and second direction 86 also include aligned, parallel (e.g., aligned, horizontal) components, in other embodiments, the first and second directions can have two opposing, parallel components (e.g., opposing, vertical and opposing, horizontal components). Further, while in the depicted embodiment, inflecting portion 66 is convex (e.g., when viewed from an exterior of waveguide 18*a*), in other embodiments, the inflecting portion may comprise convex, concave, and/or flat portions. For example, inflecting portion 66 may include a flat portion in which outer and inner surfaces, 46 and 50, are each disposed in a horizontal plane.

The present fixtures, at least through the geometry of their waveguides, can provide zones of differing luminance. Referring to FIG. 1H to illustrate, when viewed from point 98, fixture 10*a* can provide for at least three zones of illuminance: zone 94*a*, zone 94*b*, and zone 94*c*. The zones of illuminance are created by overlapping sections of waveguide 18*a*. As shown, zone 94*a* includes one section of waveguide 18*a*, section 71, zone 94*b* includes four overlapping sections (72, 73, 74, and 75), and zone 94*c* includes two overlapping sections (76 and 77). In other words, when body 14 is coupled to a structure (e.g., 30) and waveguide 18*a* is coupled to the body, a first line extending from point 98 may extend through only one section of the waveguide before intersecting a non-waveguide structure (e.g., another portion of fixture 10*a* or structure 30) (e.g., a line in zone 94*a*). And a second line extending from point 98 may extend through two or more sections of waveguide 18*a* (e.g., two sections, such as a line in zone 94*c*, or four sections, such as a line in zone 94*b*) before intersecting a non-waveguide structure. Depending on how many overlapping sections there are, waveguide 18*a* may appear brighter or dimmer in that zone, i.e., the luminance may vary. Thus, zone 94*b* may appear brighter than zone 94*c*, and zone 94*c* may appear brighter than zone 94*a*. In certain embodiments, the perceived luminance of waveguide 18*a* may increase by at least 50% with a doubling of the overlapping sections. Thus, zone 94*c* may have a luminance that is at least 1.5 times the luminance of zone 94*a* and zone 94*c* may have an luminance that is at least 2.25 times the luminance of 94*b*. In this way, waveguide 18*a* can allow for control over light output and/or provide for aesthetically-pleasing lighting. Point 98 may be above or below and horizontally offset from fixture 10*a*.

First end 54 and second end 58 of waveguide 18*a* may be positioned differently relative to a structure (e.g., 30) to which fixture 10*a* is mounted. For example, as shown in FIG. 3C, first end 54 may be positioned in a first plane 102 (e.g., a first horizontal plane) and second end 58 may be positioned in a second plane 106 (e.g., a second horizontal plane) that is substantially parallel to and spaced apart from the first plane by a distance 108. First end 54 may be said to be positioned in first plane 102 in that a majority, by area, of a terminal surface of the first end lies in the first plane. Similarly, second end 58 may be said to be positioned in the second plane in that a majority, by area, of a terminal surface of the second end lies in the second plane. Inflecting portion 66 may be disposed outside of (e.g., not between) first plane 102 and second plane 106.

As shown in FIGS. 1A-1G, first end 54 and second end 58 of waveguide 18*a* can be spaced apart such that second end 58 is disposed closer to a structure (e.g., 30) to which fixture 10*a* is mounted than is first end 54. To illustrate, in embodiments where the structure is a ceiling, when waveguide 18*a* is coupled to body 14 and the body is coupled to the ceiling, second end 58 of waveguide 18*a* can be disposed above first end 54 of the waveguide. Additionally, or alternatively, second end 58 of waveguide 18*a* may be disposed closer to the structure than at least one of the fixture 10*a*'s light sources (e.g., 20*a* and/or 20*b*, described below). Such waveguide 18*a* geometry may permit relatively more light to be visible—both light that is dispersed out of waveguide 18*a* through outer surface 46 and/or inner surface 50 and, if not capped, light that exits out of second surface 114—which can promote desirable lighting aesthetics. In other embodiments, first end 54 and second end 58 can lie in the same plane.

Waveguide 18*a* can be configured to be coupled to body 14 such that light emitted from at least one of fixture 10*a*'s light sources (e.g., 20*a*, described below) is received at first end 54. Light received by first surface 110 may then propagate through waveguide 18*a* to second end 58 and exit through second surface 114. Embodiments of waveguide 18*a* can be configured to transmit greater than or equal to any one of, or between any two of, 10%, 20%, 30%, 40%, 50%, 60%, 70%, and 80% (e.g., at least 50%) of light that enters first surface 110 of first end 54 to second end 58.

Figure 1C:
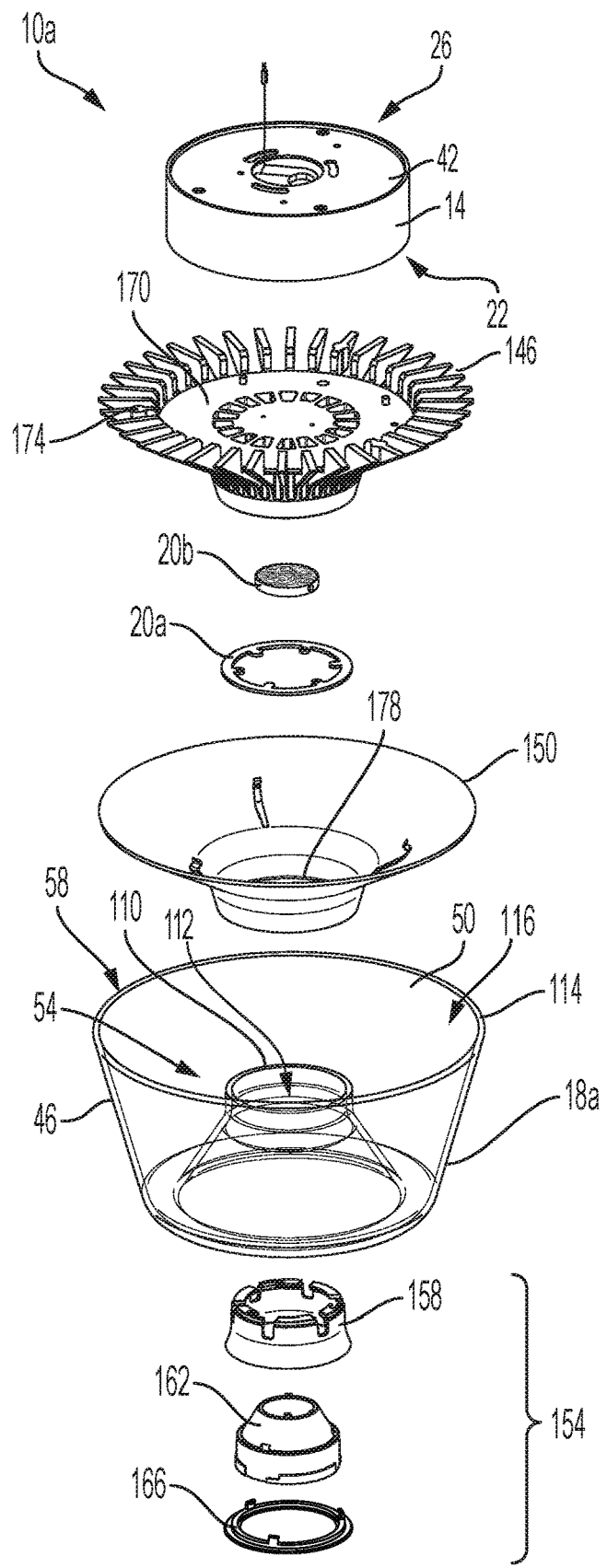
FIG. 1C is an exploded view of the light fixture of FIG. 1A.
Figure 1G:
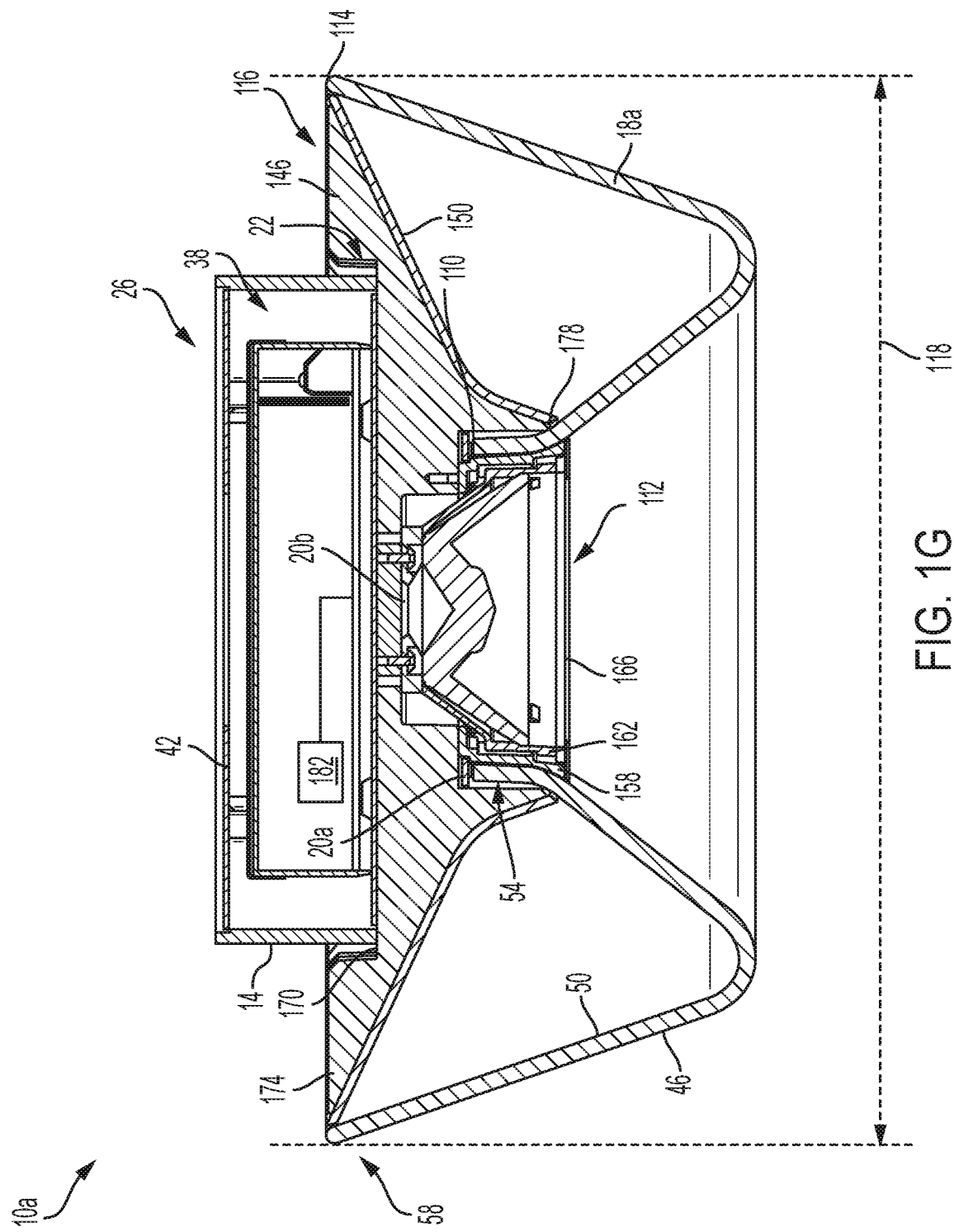
FIG. 1G is a cross-sectional side view of the light fixture of FIG. 1A, taken along line 1G-1G of FIG. 1D.
Figure 1H:
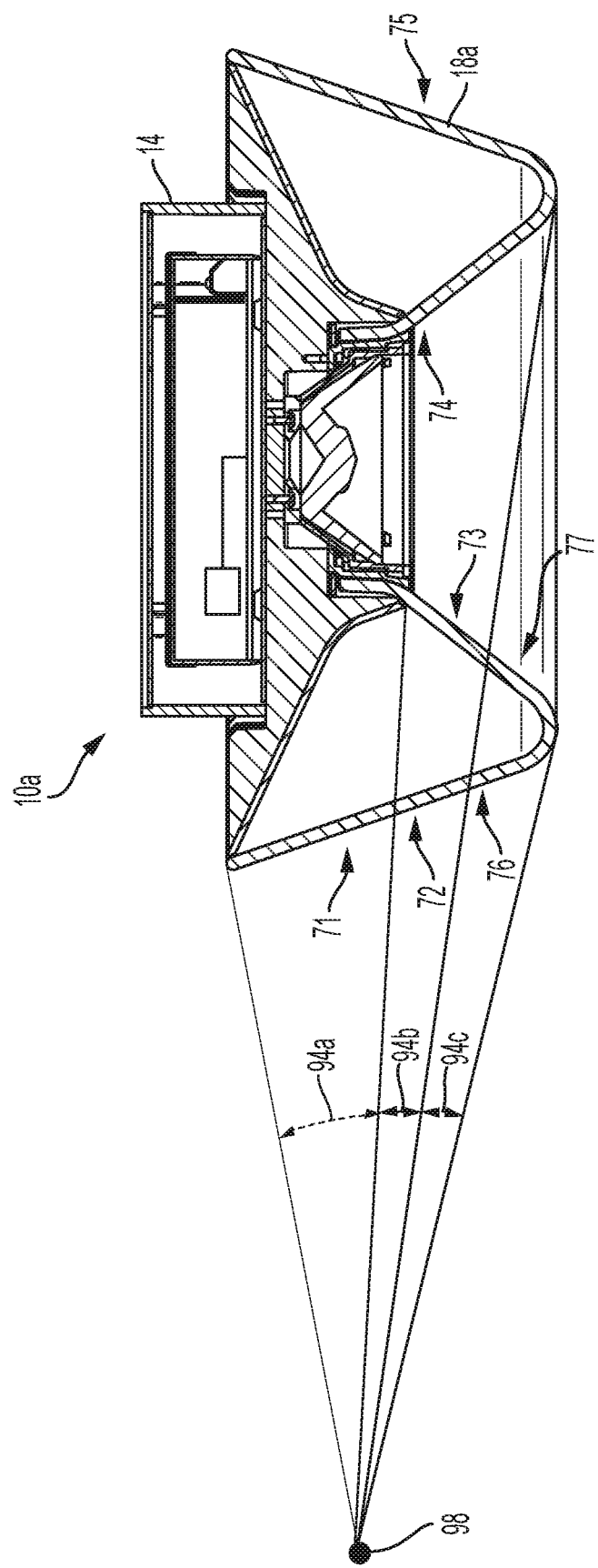
FIG. 1H is a cross-sectional side view of the light fixture of FIG. 1A, taken along line 1G-1G of FIG. 1D, showing zones of differing luminance provided by the fixture.
Figure 8B:
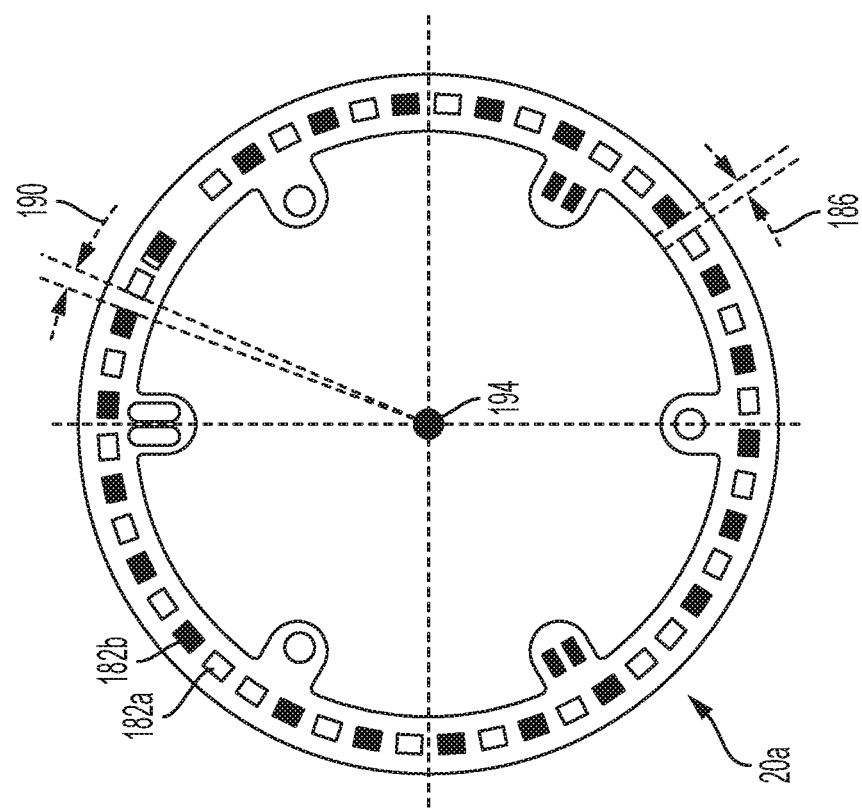
FIGS. 8A and 8B depict light sources suitable for use as first light sources of the present light fixtures.
Figure 8A:
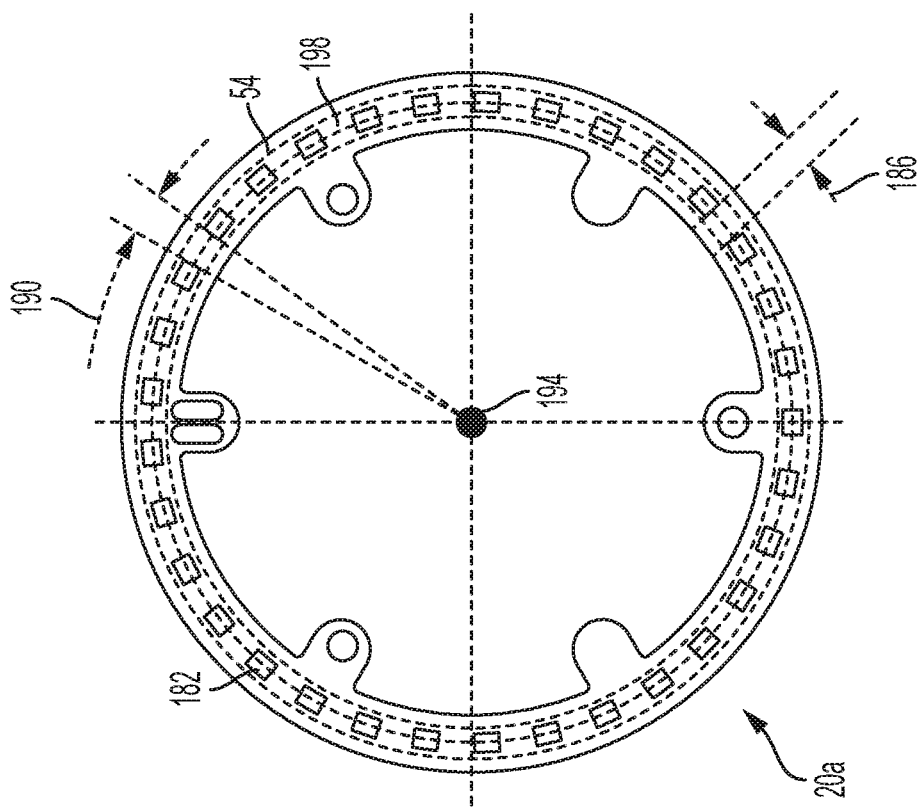

As illustrated in FIGS. 1C and 1G, first light source 20*a* can emit light into first end 54 via first surface 110 of waveguide 18*a*. In certain embodiments, first surface 110 of first end 54 may be configured to receive a majority of the light emitted by light source 20*a*. In such embodiments, first light source 20*a* may be positioned adjacent to the first surface 110 of first end 54. For example, first surface 110 may be substantially flat, having at least 90% of the area of first surface 110 in a common plane. That plane may be substantially parallel to structure 30 and substantially parallel to a plane that includes a surface of light source 20*a*. Additionally or alternatively, the first light source 20*a* and first end 54 may have the same shape (e.g., annular, as shown). While first light source 20*a* is depicted as being annular, it may have any suitable shape, including square, rectangular, or triangular, and first end 54 may be shaped accordingly. In these ways and others, the proportion of light emitted by first light source 20*a* that is output by waveguide 18*a* (the Light Output Ratio, or L.O.R.) may be greater than or equal to any one of, or between any two of, 10%, 20%, 30%, 40%, or 50% (e.g., at least 25%). Waveguide 18*a* and/or first light source 20*a* can be configured such that, when the first light source is illuminated, waveguide 18*a* glows uniformly. To illustrate, and referring additionally to FIG. 8A, shown is an exemplary first light source 20*a*. As depicted, first light source 20*a* can comprise a plurality of LEDs 182 (so too, may second light source 20*b*, described below). For each of LEDs 182, a minimum distance 186 between the LED and another one of the LEDs can be substantially the same. When the first light source is circular (as shown), LEDs 182 can be spaced from one another at substantially equal angular intervals 190 around a central axis 194. In one or more of these ways, light source 20*a* can output light uniformly. And first end 54 of waveguide 18*a* can be configured to cooperate with light source 20*a*. To illustrate, for each of LEDs 182, a distance (e.g., 186) between the LED and an adjacent one of the LEDs can be substantially equal to a perimeter of the first surface of first end 54 (indicated by the innermost or outermost dashed lines in FIG. 8A) divided by the number of the LEDs. The perimeter of first end 54 may be the centerline of first surface 110 (e.g., that is equally spaced from outer surface 46 and inner surface 50). If, for example, first surface 110 is wider than ones of the LEDs, that perimeter can be substituted for that of a closed shape lying on the first surface, indicated by the dashed line lying between the innermost and outermost dashed lines in FIG. 8A.

Returning to FIGS. 1A-1G, waveguide 18*a* includes a first opening 112 (best seen in FIG. 1G and FIG. 3A). First opening 112 may allow light emitted from at least one of the light sources (e.g., 20*b*) to pass through the first opening when the waveguide is coupled to body 14. For example, fixture 10*a* includes a second light source 20*b* that is configured to emit light through first opening 112. As shown, no portion of waveguide 18*a* extends within a volume defined by a projection of first opening 112's perimeter (e.g., the projection being along a central axis of the first opening, which may be the same as central axis 126 (FIG. 3A) of the waveguide). This may allow light from second light source 20*b* to be emitted from fixture 10*a* substantially unimpeded by waveguide 18*a*. For example, greater than any one of, or between any two of, 50%, 60%, 70%, and 90% of light source 20*b*'s light output can be delivered through first opening 112 and out of fixture 10*a*. The perimeter of first opening 112 can, but need not, be defined by first end 54 of waveguide 18*a*.

Second end 58 of waveguide 18*a* may also include an opening: second opening 116. Second opening 116 can have a perimeter that is larger than that of first opening 112. To illustrate, the perimeter of second opening 116, when projected (along central axis 126), can define a volume that contains first opening 112. In other words, second end 58 may define a largest transverse dimension 118 (FIG. 1G) and/or a largest cross-sectional perimeter 122 (FIG. 1F) of waveguide 18*a*. And cross-sectional perimeter 122, when projected, may define a volume that contains a majority, up to and including all, of the waveguide.

In the embodiment shown, waveguide 18*a* is symmetrical about central axis 126 (FIG. 3A). For example, central axis 126 may be substantially equidistant from opposing points along a perimeter of first opening 112 of first end 54 and/or second opening 116 of second end 58. Waveguide 18a may be described herein with reference to body 14 being coupled to a horizontal structure, it should nevertheless be understood that waveguide 18a may be placed in other orientations; for example, body 14 may be coupled to a vertical structure.

Figure 4A:
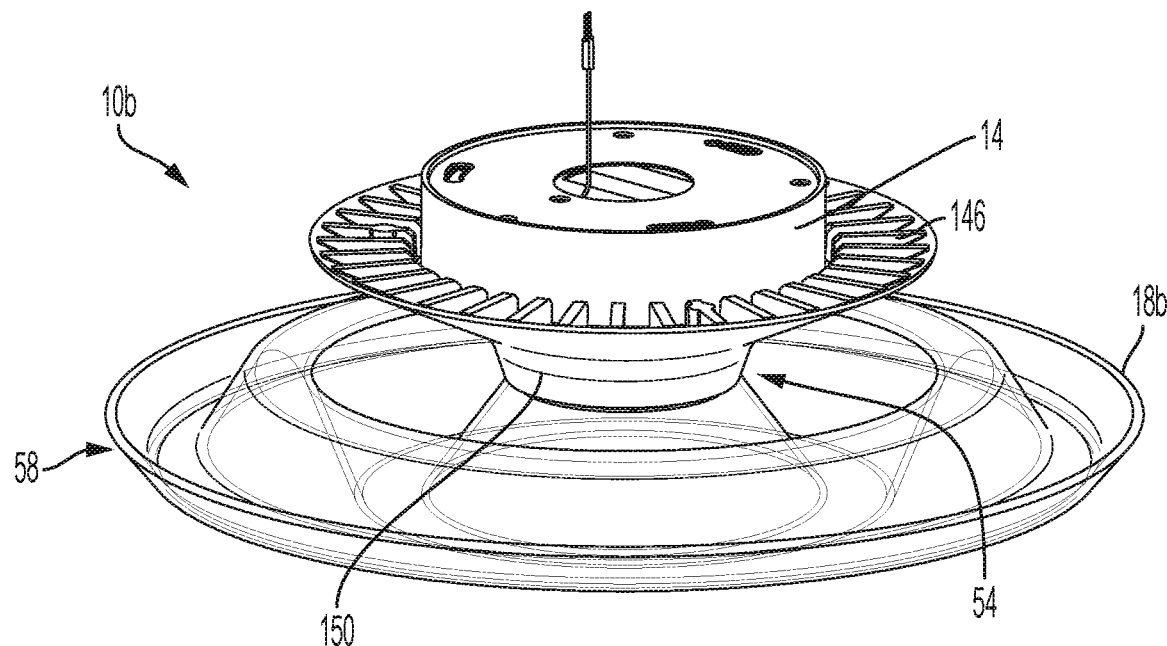
FIG. 4A is a perspective view of a second embodiment of the present light fixtures that has a waveguide with multiple inflecting portions.
Figure 4B:
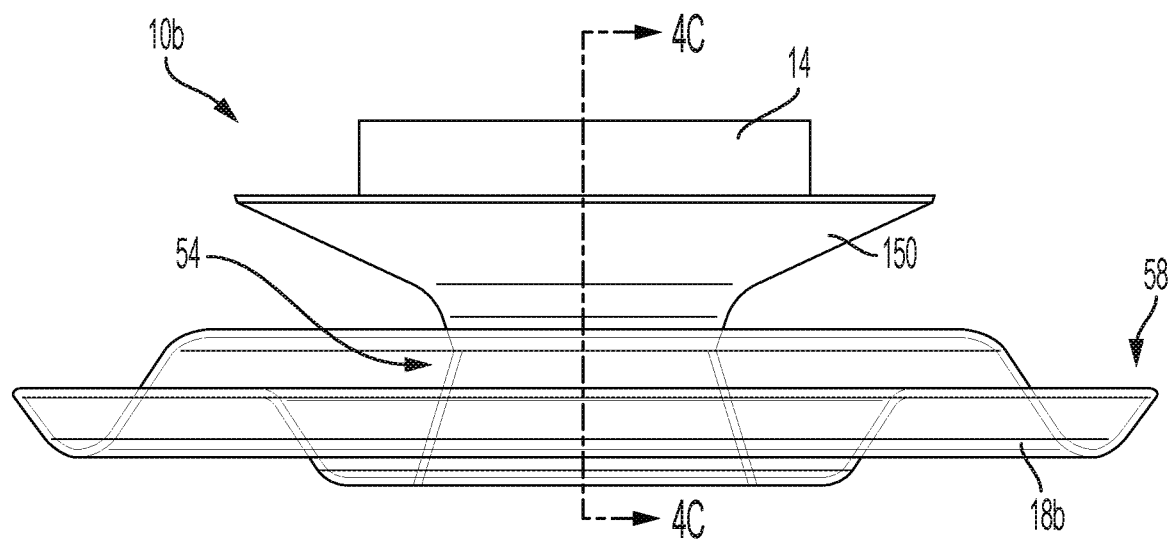
FIG. 4B is a side view of the light fixture of FIG. 4A.
Figure 4C:
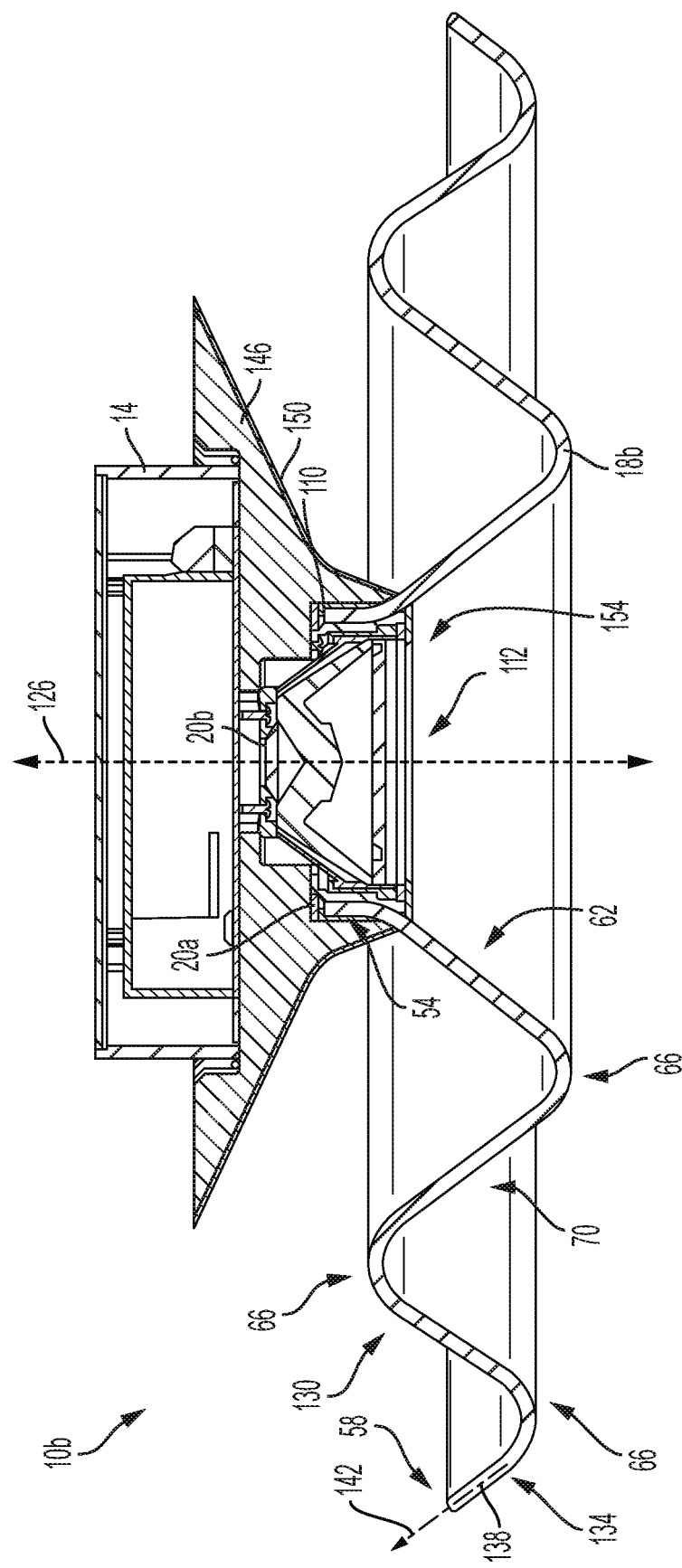
FIG. 4C is a cross-sectional side view of the light fixture of FIG. 4A, taken along line 4C-4C of FIG. 4B.
Figure 6B:
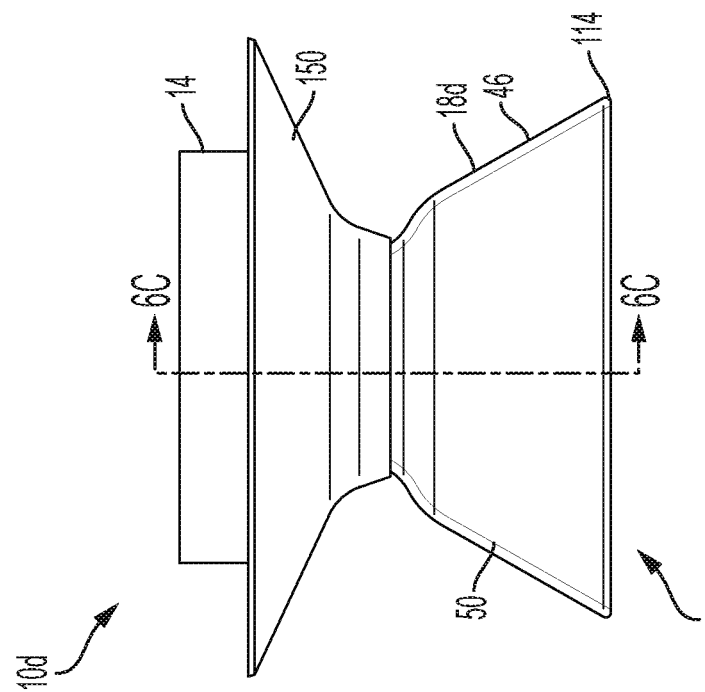
FIG. 6B is a side view of the light fixture of FIG. 6A.
Figure 6A:
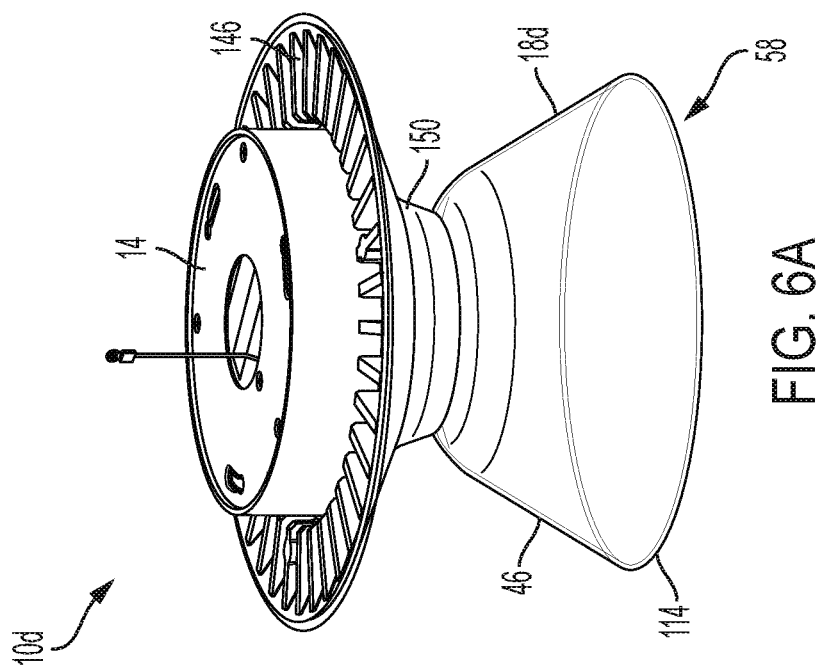
FIG. 6A is a perspective view of a fourth embodiment of the present light fixtures that has a waveguide with first and second portions that extend in directions having parallel, but not opposing, components.

While as depicted in FIGS. 1A-1G, fixture 10a has a single waveguide 18a whose cross-section includes, on each side of central axis 126, a single inflecting portion 66 connecting two portions 62 and 70, other embodiments of the present fixtures may have multiple waveguides and/or one or more waveguides having a different geometry than that shown in FIGS. 1A-1G (and FIGS. 3A-3D). Referring to FIGS. 4A-3C, for example, shown is a second embodiment 10b of the present fixtures that is substantially the same as fixture 10a, except that fixture 10b's waveguide 18b has a cross-section including, on each side of central axis 126, three or more portions (e.g., four, as shown, including third and fourth portions 130 and 134) connected by two more inflecting portions 66 (e.g., three, as shown). As depicted, a line 138 extending from the outermost inflecting portion 66 to second end 58 (e.g., along fourth portion 134) is aligned in a direction 142 such that waveguide 18b can emit light back toward a structure (e.g., 30) to which fixture 10b is coupled as described above.

Wave guides of the present fixtures can have other geometries as well, including those that are not configured to cast light back onto a structure (e.g., 30) to which the fixture is coupled. Examples are shown in FIGS. 5A and 5B and FIGS. 6A-6C, which depict third and fourth embodiments, 10c and 10d, respectively, of the present fixtures that are substantially the same as fixture 10a except for the geometries of their waveguides. Waveguide 18c of fixture 10c, for example, is an annular cylinder having no inflecting portion 66. In embodiments having a waveguide without an inflecting portion 66, such as fixture 10c, it may be particularly desirable to have a cap or cover around second end 58.

The cross-section of fixture 10d's waveguide 18d has first and second portions, 62 and 70, connected by an inflecting portion 66 as with fixture 10a's waveguide 18a. But in fixture 10d, the direction along which first portion 62 extends (first direction 78) and the direction along which second portion 70 extends (second direction 86) have two parallel, aligned components. To illustrate, both first direction 78 and second direction 86 are sloped downward and outward, relative to central axis 126.

Figure 7A:
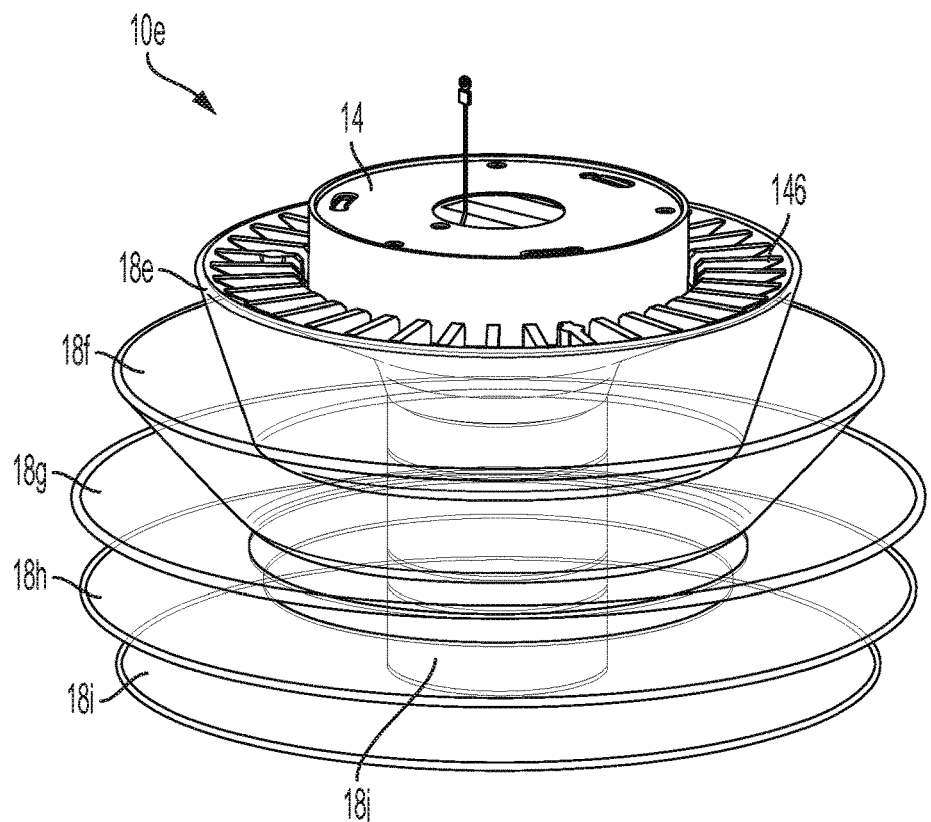
FIG. 7A is a perspective view of a fifth embodiment of the present light fixtures that has multiple waveguides.
Figure 7B:
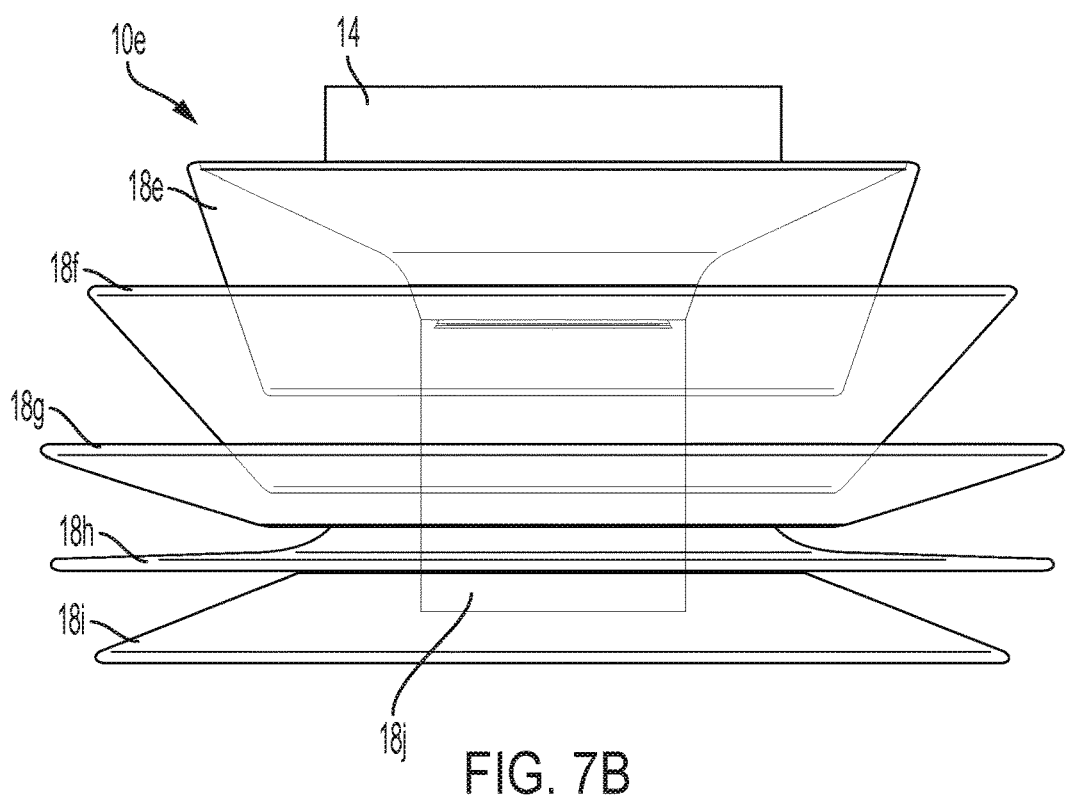
FIG. 7B is a side view of the fixture of FIG. 7A.

Referring to FIGS. 7A and 7B, shown is a fifth embodiment 10e of the present fixtures that is substantially the same as fixture 10a except that fixture 10e includes multiple waveguides (e.g., five waveguides, 18e-18i). As shown, each of fixture 10e's waveguides can have a different geometry. Further, fixture 10e can have a light source (e.g., first light source 20a) configured to transmit light into first end 54 of one or more of—up to including each of—fixture 10e's waveguides and/or multiple light sources (e.g., two or more, optionally three or more, light sources), each configured to transmit light into a first end of a respective one of the waveguides (and that, optionally, are independently-controllable).

Returning to FIGS. 1A-1G, fixture 10a may comprise one or more components coupled to body 14 and/or waveguide 18a, such as a heat sink 146, a cover 150, and/or an optical assembly 154 (e.g., best shown in FIG. 1C, having a waveguide retainer 158, optic holder 162 with a lens that can focus and/or magnify light emitted from second light source 20b, and/or bezel 166). One or more of these components may be omitted from fixture 10a and/or replaced with similarly-functioning components as known in the art. For instance, in some fixtures that are otherwise similar to fixture 10a, cover 150 may be omitted. In fixture 10a, such components of the fixture (and others) can be contained within waveguide 18a, which may promote desirable aesthetics. To illustrate, the volume defined by a projection of waveguide 18a's cross-sectional perimeter (e.g., 122, FIG. 1F) may contain a majority of, up to including all of, each of one or more of fixture 10a's components, such as body 14, heat sink 146, cover 150, and/or optical assembly 154. In other words, that cross-sectional perimeter may be a cross-sectional perimeter of fixture 10a.

In the embodiment shown, heat sink 146 includes a base 170 and a plurality of cooling fins 174 extending from the base (e.g., extending radially away from the center of fixture 10a, optionally, with equiangular spacing). For example, cooling fins 174 can extend in a radial direction (e.g., perpendicular to central axis 126 of waveguide 18a) away from first end 54 and toward second end 58.

Cover 150 may be coupled to heat sink 146 and may redirect light cast upon the cover (e.g., by light source 20a and/or 20b) and/or shield at least a portion of light fixture 10a's components (e.g., heat sink 146, body 14, and/or the like) from view. To illustrate, cover 150 may be sized and positioned such that it spans the length of each of cooling fins 174 to obstruct heat sink 146 from the view of a typical observer of fixture 10a (e.g., with the cover being positioned between waveguide 18a and the heat sink). In the embodiment shown, cover 150 includes an aperture 178 (FIG. 1C) through which light emitted from second light source 20b can pass. Cover 150 can, but need not, include a reflective surface. To illustrate, a surface of cover 150 can comprise any suitable finish, including a polished, mirrored, coated, or sandblasted finish, a finish that matches that of body 14 and/or heat sink 146, and/or the like. Further, cover 150 may comprise one or more functional components (e.g., 202, discussed below), such as a Wi-Fi router, a Wi-Fi range extender, a speaker, a camera, and/or an additional light source.

Optical assembly 154 may be configured to secure one or more of the light sources (e.g., 20a and/or 20b) relative to waveguide 18a such that those light source(s) can deliver light to and/or through the waveguide as described above. For example, as best seen in FIG. 1G, light sources 20a and 20b may be interposed between heat sink 146 and components of optical assembly 154. Optical assembly 154 may comprise a waveguide retainer 158, an optic holder 162, and a bezel 166. In some embodiments, optic holder 162 may be sized to fit within first opening 112 to secure second light source 20b relative to fixture 10a. And in such embodiments, waveguide retainer 158 and bezel 166 may cooperate to retain optic holder 162 within first opening 112. Waveguide retainer 158 and bezel 166 may be coupled to waveguide 18a (and/or another portion of fixture 10a) in any suitable manner, such as, for example, via fasteners (e.g., clips, tabs, interlocking features, bolts, screws, and/or the like).

The light sources (e.g., 20a and 20b) can include any suitable light source, whether manmade electrical-to-optical transducers or naturally occurring (such as the sun and moon or other naturally occurring emitters such as radioactive decay). Examples of manmade electrical-to-optical transducers include various light emitters, although the emitted light may be in the visible spectrum or in other wavelength ranges. Suitable light generation sources for use as the transducer include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, organic LEDs (OLEDs), and micro photonic crystal LEDs; as well as other sources such as micro super luminescent Diodes (SLD) and micro laser diodes. These light generation technologies are given by way of non-limiting examples, and other light generation technologies may be used to implement the present invention.

When a manmade electric-to-optical transducer is a light source, the light source may use a single emitter to generate light, or may combine light from some number of emitters that generate the light. A lamp or 'light bulb' is an example of a single source. An LED light engine may use a single output for a single source but typically combines light from multiple LED type emitters within the single light engine. Accordingly, the term light source should generally be understood as comprising a single light source or a group of light sources that operate together through common control. Light sources 20a and 20b may provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the light source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer may or may not be pixelated for control purposes.

Manmade electric-to-optical transducers may be used in this invention in wave lengths outside the visible spectrum. In these instances, these other wave lengths may be used as a means of a secondary purpose. One example of this is near UV wavelengths which are used currently for sterilizing a space or the fixture itself. These methods are meant to be non-limiting examples as there can be numerous options which should be known to those skilled in the art. Light sources 20a and 20b may emit light having different correlated color temperatures (CCT). To illustrate, waveguide 18a can be configured to disperse light received from first light source 20a at a first color temperature, and second light source 20b may be configured to emit light at a second color temperature that is 90% or less of the first color temperature (depending on the dim state of the first and second light sources, as described below), such as 85% or less, 80% or less, 75% or less, 70% or less, 65% or less, 60% or less, or 55% or less of the first color temperature. Additionally, or alternatively, the second color temperature can be 110% or more of the first color temperature, such as 120% or more, 130% or more, 140% or more, 150% or more, 160% or more, 170% or more, 180% or more, or 190% or more of the first color temperature.

In certain embodiments, light source 20a may emit light at a first peak wavelength of electromagnetic radiation and light source 20b may emit light at a second peak wavelength of electromagnetic radiation that is 90% or less of the first peak wavelength, such as 85% or less, 80% or less, 75% or less, 70% or less, 65% or less, or 60% or less of the first peak wavelength. Additionally, or alternatively, the second peak wavelength of electromagnetic radiation may be 110% or more of the first peak wavelength of electromagnetic radiation, such as 120% or more, 130% or more, 140% or more, 150% or more, 160% or more, or 170% or more of the first peak wavelength.

Light source 20a can be a warm dim light source such that, for example, as the first light source is dimmed, a color temperature of light dispersed from the waveguide decreases. Such functionality can provide for an aesthetically-pleasing effect, enhanced (e.g., along with light output in such a dimmed state) by waveguide 18a. To illustrate, and referring additionally to FIG. 8B, first light source 20a can include a first set of LEDs 182a having a first color temperature and a second set of LEDs 182b having a second color temperature that is less than the first color temperature (e.g., the second color temperature can be 90% or less of the first color temperature). The first color temperature can be, for example, greater than or equal to 3,000 K (e.g., 3,000 K), and the second color temperature can be, for example, less than or equal to 2,500 K (e.g., 1,800 K). And when light source 20a is dimmed, one or more of LEDs 182a can be dimmed before and/or more than one or more of LEDs 182b. In this way, as light source 20a is dimmed, light output from the light source—and thus light dispersed from waveguide 18a—becomes warmer. To promote uniformity of light output from waveguide 18a as light source 20a is dimmed, each of LEDs 182a can be positioned adjacent to one or two of LEDs 182b. Like first light source 20a, second light source 20b can also be a warm dim light source.

Light sources 20a and 20b may be independently-controllable. For purposes of this specification, controlling a light source includes dimming the light source, switching the light source between on and off states, changing the color of the light source, and any other operation that involves adjusting the quantity, color, or temperature of light emitted from the light source. In this way and others, fixture 10a may operate in different lighting modes to cast light in different ways. For example, first light source 20a may be switched between an on state in which the first light source emits light and an off state in which the light source does not emit light and/or dimmed without controlling second light source 20b. Likewise, second light source 20b may be controlled independently of first light source 20a. For further example, a color temperature of light (or a peak wavelength of electromagnetic radiation within the electromagnetic spectrum) emitted from second light source 20b can be changed while maintaining a color temperature of light (or a peak wavelength of electromagnetic radiations within the electromagnetic spectrum) emitted from first light source 20a and thus light dispersed from waveguide 18a. For yet further example, a color temperature of second light source 20b can be maintained while dimming first light source 20a.

In certain embodiments, dimming functionality may be used as a means of communicating with occupants of the space. A simple example of this would be an on-off sequence to get an occupant's attention, such as utilized during a theater intermission. In another method the dimming could be used as a means of communicating electromagnetic signals to communication devices (e.g., cell phones or computers) that are designed to capture the pulses of electromagnetic radiation and extract information from the signal. This may be done with electromagnetic wavelengths outside of the visible spectrum. In such embodiments, waveguide 18a may be used as an antenna to direct signals to communication devices.

Figure 9:
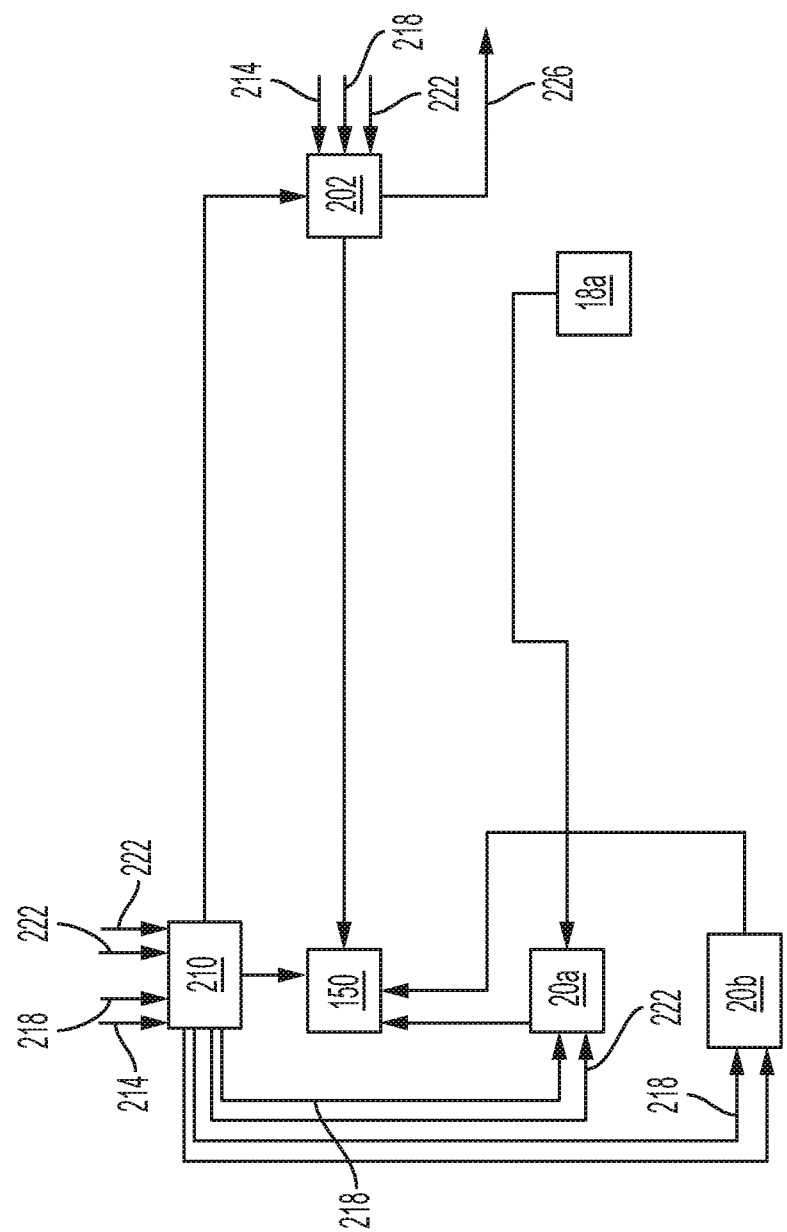
FIG. 9 is a schematic showing circuitry for controlling components of the present light fixtures.

Control of light sources 20a and 20b—and other components of fixture 10a—can be facilitated by a control system, an example of which is shown in FIG. 9. Components of such a control system (e.g., controller 210) can be, for example, disposed within interior volume 38 of body 14. Provided by way of illustration, the control system can include a controller 210, which can comprise, for example, a processor (e.g., a microcontroller/microprocessor, a central processing unit (CPU), a field-programmable gate array (FPGA) device, an application-specific integrated circuit (ASIC), a driver, another hardware device, a firmware device, or any combination thereof). Controller 210 can also include or be coupled to a memory (e.g., a computer-readable storage device), which can be configured to store instructions, one or more thresholds, one or more data sets, and/or the like, one or more interfaces, one or more I/O devices, a power source, one or more sensors), and/or the like.

Controller 210 can be configured to control one or more components of fixture 10a, such as the light sources (e.g., to individually and/or collectively switch them between on and off states and/or to dim them). Controller 210 may be physically or wirelessly coupled to one or more components of fixture 10a and configured to control operation of those one or more components via one or more user-initiated and/or automatic commands or parameters. In some embodiments, controller 210 may be connectible to a controller (e.g., 210) of another light fixture (e.g., 10a) such that the light fixtures can operate together.

As shown, controller 210 can be connected to a power line 214 (e.g., to receive AC power), a neutral line 218, and one or more input lines 222 (e.g., that can deliver dimming control signals to control the brightness of the light sources). Each of the light sources—e.g., first light source 20a and second light source 20b—can be connected to controller 210 via neutral and input lines, 218 and 222, by which the control system can control the light sources (e.g., independently).

If fixture 10a (e.g., cover 150 thereof, in some embodiments) comprises one or more functional components 202 (e.g., a Wi-Fi router, a Wi-Fi range extender, a speaker, a camera, and/or light sources other than 20a and 20b), such component(s) can also be connected to a power line 214, a neutral line 218, one or more input lines 222 (e.g., to receive an input signal such as a LAN signal) and/or one or more output lines 226 (e.g., to transmit an output signal). Further, such functional component(s)—and other components of the control system—may be in thermal communication with a heat management system (e.g., including heat sink 146) to manage heat.

Some of the present methods of operating a light fixture (e.g., 10a) comprise illuminating a first light source (e.g., 20a) of the light fixture such that light emitted by the first light source is received by a first end (e.g., 54) of a waveguide (e.g., 18a) of the light fixture, the waveguide being configured to direct the received light from the first end to a second end (e.g., 58) of the waveguide and disperse the light out of a surface (e.g., outer surface 46 and/or inner surface 50) of the waveguide when the first light source is illuminated, and illuminating a second light source (e.g., 20b) of the light fixture. In some methods, the waveguide includes an opening (e.g., 112) and the second light source is positioned within an interior volume defined by a projection of the perimeter of the opening, the projection being along a central axis of the opening.

Some methods comprise turning off or dimming the first light source without turning off or dimming the second light source. Some methods comprise turning off or dimming the second light source without turning off or dimming the first light source. Some methods comprise dimming the first light source, wherein, as the first light source is dimmed, a color temperature of light (or peak wavelength of electromagnetic radiation) dispersed from the waveguide decreases. Some methods comprise maintaining a color temperature (or peak wavelength of electromagnetic radiation) of the second light source while the first light source is dimmed. Some methods comprise changing a color temperature of light (or peak wavelength of electromagnetic radiation) emitted from the second light source while maintaining a color temperature of light (or peak wavelength of electromagnetic radiation) dispersed from the waveguide The above specification and examples provide a complete description of the structure and use of exemplary embodiments.

Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:
1. A light fixture comprising:
a body;
a first light source configured to be coupled to the body, the first light source configured to emit light;
a waveguide comprising:
a first end comprising a first surface; and
a second end comprising a second surface;
wherein the waveguide is configured to be coupled to the body such that:
light emitted from the first light source is received by the first end and is directed to the second end; and
a portion of the waveguide that is disposed between the first and second ends is exposed; and
a second light source configured to be coupled to the body, the second light source configured to emit light through an opening in the waveguide;
wherein the body is configured to be coupled to the waveguide and to a structure such that each of the first and second ends of the waveguide is positioned outside of the structure and on a same side of the structure.

2. The light fixture of claim 1, further comprising circuitry electrically coupled to the first light source and the second light source, the circuitry configured to independently control a luminous output of the first light source and a luminous output of the second light source.

3. The light fixture of claim 1, wherein the first light source comprises a plurality of light emitting diodes (LEDs).

4. The light fixture of claim 3, wherein:
a perimeter of the first surface is curved; and
the plurality of LEDs of the first light source are positioned in a curved shape.

5. The light fixture of claim 1, wherein:
the waveguide is configured to disperse light received from the first light source at a first color temperature; and
the second light source is configured to emit light at a second color temperature that is:
90% or less of the first color temperature; or
110% or more of the first color temperature.

6. The light fixture of claim 1, wherein a perimeter of the second surface is greater than a perimeter of the first surface.

7. The light fixture of claim 1, wherein:
a majority, by area, of the first surface is in a first plane;
a majority, by area, of the second surface is in a second plane; and
a portion of the waveguide between the first end and the second end is not disposed between the first plane and the second plane.

8. The light fixture of claim 1, wherein:
at least 90% of the first surface, by area, is in a first plane; and
the second surface is curved.

9. The light fixture of claim 1, wherein:
the first end of the waveguide includes the opening; and
the second light source is positioned within a volume defined by a projection of a perimeter of the opening, the projection being along a central axis of the opening.

10. The light fixture claim 1, wherein:
a perimeter of the first surface is curved; and
a perimeter of the second surface is curved.

11. The light fixture of claim 1, wherein the body is configured to be coupled to the waveguide and to the structure such that light emitted by the first light source is dispersed out of the second surface of the waveguide and onto the structure.

12. The light fixture of claim 11, wherein the body is configured to be coupled to the waveguide and to the structure such that the second end of the waveguide is disposed closer to the structure than is the first end of the waveguide.

13. The light fixture of claim 1, wherein the waveguide has a transmittance, measured through inner and outer surfaces of the waveguide that each extend from the first end to the second end, of at least 90%.

14. A method of operating a light fixture, the method comprising:
illuminating a first light source of the light fixture such that light emitted by the first light source is received by a first end of a waveguide of the light fixture, the waveguide being configured to:
direct the received light from the first end to a second end of the waveguide; and
disperse light out of a surface of the waveguide when the first light source is illuminated;
wherein a portion of the waveguide that is disposed between the first and second ends is exposed; and
illuminating a second light source of the light fixture;
wherein the light fixture is coupled to a structure such that each of the first and second ends of the waveguide is positioned outside of the structure and on a same side of the structure.

15. The method of claim 14, wherein:
the waveguide includes an opening; and
the second light source is positioned within a volume defined by a projection of a perimeter of the opening, the projection being along a central axis of the opening.

16. The method of claim 14, further comprising turning off or dimming the first light source without turning off or dimming the second light source.

17. The method of claim 14, further comprising turning off or dimming the second light source without turning off or dimming the first light source.

18. The method of claim 14, further comprising:
dimming the first light source;
wherein, as the first light source is dimmed, a color temperature of light dispersed from the waveguide decreases.

19. The method of claim 18, further comprising maintaining a color temperature of the second light source while the first light source is dimmed.

20. A light fixture comprising:
a body;
a first light source configured to be coupled to the body, the first light source configured to emit light;
a waveguide comprising:
a first end comprising a first surface; and
a second end comprising a second surface;
wherein the waveguide is configured to be coupled to the body such that light emitted from the first light source is received by the first end and is directed to the second end;
a second light source configured to be coupled to the body, the second light source configured to emit light through an opening in the waveguide; and
a second waveguide that:
comprises a first end and a second end; and
is configured to be coupled to the body such that light emitted from the first light source and/or a third light source is received by the first end of the second waveguide and is directed to the second end of the second waveguide.

21. The light fixture of claim 1, wherein a maximum transverse dimension of the waveguide is larger than a maximum transverse dimension of any other component of the light fixture.

22. The light fixture of claim 1, wherein:
the waveguide includes an outer surface and an opposing inner surface, each extending between the first and second ends; and
at least a majority of the outer surface is exposed.

23. The light fixture of claim 1, wherein:
an exposed surface of the waveguide defines a channel in communication with the opening; and
the second light source is configured to emit light through the channel.

24. The method of claim 14, wherein a maximum transverse dimension of the waveguide is larger than a maximum transverse dimension of any other component of the light fixture.

25. The method of claim 14, wherein:
the waveguide includes an outer surface and an opposing inner surface, each extending between the first and second ends; and
at least a majority of the outer surface is exposed.

26. The method of claim 14, wherein:
an exposed surface of the waveguide defines a channel; and
illuminating the second light source is performed such that the second light source emits light through the channel.

27. The method of claim 14, wherein the light fixture is coupled to the structure such that the second end of the waveguide is disposed closer to the structure than is the first end of the waveguide.

\* \* \* \* \*